(12) United States Patent  
Radigan

(10) Patent No.: US 8,667,474 B2  
(45) Date of Patent: Mar. 4, 2014

(54) GENERATION OF PARALLEL CODE REPRESENTATIONS

(75) Inventor: James Radigan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1146 days.

(21) Appl. No.: 12/487,663

(22) Filed: Jun. 19, 2009

(65) Prior Publication Data

US 2010/0325608 A1 Dec. 23, 2010

(51) Int. Cl.  
*G06F 9/45* (2006.01)

(52) U.S. Cl.  
USPC ............................ 717/136; 717/140; 717/143

(58) Field of Classification Search  
None  
See application file for complete search history.

(56) References Cited

U.S. PATENT DOCUMENTS

| | | | | |
|---|---|---|---|---|
| 6,247,169 | B1* | 6/2001 | DeLong ........................ | 717/131 |
| 6,708,325 | B2* | 3/2004 | Cooke et al. .................. | 717/124 |
| 7,257,807 | B2 | 8/2007 | Nikitin et al. | |
| 7,308,680 | B2* | 12/2007 | Grover et al. ................. | 717/114 |
| 7,530,069 | B2 | 5/2009 | Kawahara et al. | |
| 8,151,244 | B2* | 4/2012 | Hsu et al. ...................... | 717/113 |
| 2004/0230962 | A1* | 11/2004 | Ogasawara .................... | 717/151 |
| 2005/0235270 | A1* | 10/2005 | Sanyal ........................... | 717/136 |
| 2006/0064680 | A1* | 3/2006 | Devane .......................... | 717/140 |
| 2006/0242633 | A1* | 10/2006 | De Rijck ....................... | 717/140 |
| 2006/0277529 | A1* | 12/2006 | Michimoto et al. ........... | 717/136 |
| 2007/0006192 | A1* | 1/2007 | Grover et al. ................. | 717/146 |
| 2007/0283322 | A1* | 12/2007 | Hsu et al. ...................... | 717/113 |
| 2008/0120300 | A1* | 5/2008 | Detlefs et al. ................. | 707/8 |
| 2009/0077545 | A1 | 3/2009 | Silvera et al. | |
| 2009/0259997 | A1* | 10/2009 | Grover et al. ................. | 717/136 |
| 2010/0070956 | A1* | 3/2010 | Leung et al. .................. | 717/143 |
| 2010/0306733 | A1* | 12/2010 | Bordelon et al. ............. | 717/106 |
| 2010/0306736 | A1* | 12/2010 | Bordelon et al. ............. | 717/109 |
| 2010/0306750 | A1* | 12/2010 | Helovuo ........................ | 717/143 |
| 2010/0306752 | A1* | 12/2010 | Bordelon et al. ............. | 717/149 |
| 2011/0099541 | A1* | 4/2011 | Blomstedt et al. ............ | 717/136 |
| 2013/0254751 | A1* | 9/2013 | Howard ......................... | 717/136 |

FOREIGN PATENT DOCUMENTS

WO  2007113369 A1  10/2007

OTHER PUBLICATIONS

Gasper et al., "Automatic Parallelization of Sequential C Code," 2003, Department of Mathematics and Computer Science, South Dakota School of Mines and Technology, dowloaded from CiteSeerX database on Dec. 7, 2012, pp. 1-11.*

(Continued)

*Primary Examiner* — Thuy Dao  
*Assistant Examiner* — Stephen Berman  
(74) *Attorney, Agent, or Firm* — Kevin Sullivan; Kate Drakos; Micky Minhas

(57) ABSTRACT

A generated grouped representation of existing source code can define regions of the existing source code. A set of the regions that can run in parallel can be identified based on the grouped representation. The grouped representation can be converted into a modified representation, such as modified source code or a modified intermediate compiler representation, which can be configured to be resolved or executed to self-schedule the set of regions to run in parallel as a set of tasks. Additionally, the source code can include one or more exception handling routines, and user input can be received to identify in one or more lambda expressions one or more regions of the source code to be run in parallel as one or more tasks.

20 Claims, 29 Drawing Sheets

(56) References Cited

OTHER PUBLICATIONS

Saito et al., "The Design of the PROMIS Compiler," 1999, Department of Information and Computer Science, University of California at Irvine, downloaded from CiteSeerX database on Dec. 10, 2012, pp. 1-15.*

Gaston-Hillar, "Use lambda expressions in C# to simplify the parallelized code," May 13, 2009, downloaded from the Internet: <url>:http://software.intel.com/en-us/blogs/2009/05/13/use-lambda-expressions-in-c-to-simplify-the-parallelized-code on Dec. 11, 2012, pp. 1-3.*

"Data dependency," 2007, dowloaded from Wikipedia (via The Wayback Machine) on Dec. 12, 2012, pp. 1-4.*

Girkar et al., "Automatic extraction of functional parallelism from ordinary programs," 1992, IEEE Transactions Parallel and Distributed Systems (vol. 3, Issue:2), pp. 166-178.*

Gupta et al., "Automatic Parallelization of Recursive Procedures," International Journal of Parallel Programming Dec. 2000, vol. 28, Issue 6, pp. 537-562.*

Moreira et al., "The performance impact of granularity control and functional parallelism," Languages and Compilers for Parallel Computing Lecture Notes in Computer Science vol. 1033, 1996, pp. 581-597.*

Zumbusch, Gerhard, "A Container-Iterator Parallel Programming Model", Retrieved at <<cse.mathe.uni-jena.de/pub/zumbusch/ppam07.ps.gz>>, Copyright notice Springer-Verlag Berlin Heidelberg 2007, pp. 10.

Strey, et al., "Automatic Generation of Efficient Parallel Programs from EpsiloNN Neural Network Specifications", Retrieved at <<ftp://neuro.informatik.uni-ulm.de/ni/alfred/imacs97.ps.gz>>, Proceedings of the 15th IMACS World Congress on Scientific Computation, Modelling and Applied Mathematics, Aug. 24-29, 1997, pp. 6.

Sen, Ranjan, "Developing Parallel Programs", Retrieved at <<http://msdn.microsoft.com/en-us/library/cc983823.aspx>>, Sep. 2008, pp. 1-12.

"Intel Parallel Composer", Retrieved at <<http://jp.xlsoft.com/documents/intel/parallel/catalog/Parallel_Composer_Brief.pdf>>, Copyright notice date 2009, pp. 9.

Donaldson, et al., "Auto-Parallelisation of Sieve C++ Programs", Retrieved at <<http://www.codeplay.com/news/HiPEAC07.pdf>>, HiPEAC Industrial Workshop 2007, pp. 1-10.

Richards, Andrew, "The Codeplay Sieve C++ Parallel Programming System", Retrieved at <<http://www.codeplay.com/downloads_public/sievepaper-2columns-normal.pdf>>, Copyright notice Codeplay Software Limited 2006, pp. 1-8.

"Visual C++ Team Blog: Lambdas, auto, and static_assert: C++0x Features in VC10, Part 1", Retrieved at <<http://blogs.msdn.com/vcblog/archive/2008/10/28/lambdas-auto-and-static-assert-c-0x-features-in-vc10-part-1.aspx>> on May 21, 2009, pp. 1-45.

"Lambda Expressions (C# Programming Guide)", Retrieved at <<http://msdn.microsoft.com/en-us/library/bb397687.aspx>> on Jun. 2, 2009, pp. 1-11.

"Visual Basic Programming Guide: Lambda Expressions", Retrieved at <<http://msdn.microsoft.com/en-us/library/bb531253.aspx>> on May 21, 2009.

Toub, et al., "Coding Tools: Improved Support for Parallelism in the Next Version of Visual Studio", Retrieved at <<http://msdn.microsoft.com/en-us/magazine/cc817396.aspx>> on May 21, 2009, pp. 1-14.

Polychronopoulos, Constantine D., "The Hierarchical Task Graph and Its Use in Auto-Scheduling", 1991, pp. 252-263.

De Smet, Bart, "Visual Basic 9.0 Feature Focus—Lambda Expressions—B# .NET Blog", Retrieved at <<http://community.bartdesmet.net/blogs/bart/archive/2007/08/27/visual-basic-9-0-feature-focus-lambda-expressions.aspx>> on Jun. 2, 2009, pp. 1-9.

"Visual C++ and the Parallel Patterns Library", Retrieved at <<http://msdn.microsoft.com/en-us/magazine/dvdarchive/dd434652.aspx>> on Apr. 9, 2009, pp. 1-5.

Girkar, Milind Baburao, "Functional Parallelism: Theoretical Foundations and Implementation", Thesis submitted for the Doctorate of Philosophy in Computer Science in the Graduate College of the University of Illinois at Urbana-Champaign, Dec. 1991, pp. 1-152.

Girkar, et al., "Extracting Task-Level Parallelism", Retrieved at http://portal.acm.org/toc.cfm?id=210184&type=issue&coll=GUIDE&dl=GUIDE&CFID=57390232&CFTOKEN=57782637>>, vol. 17, No. 4, Jul. 1995, pp. 600-634.

* cited by examiner

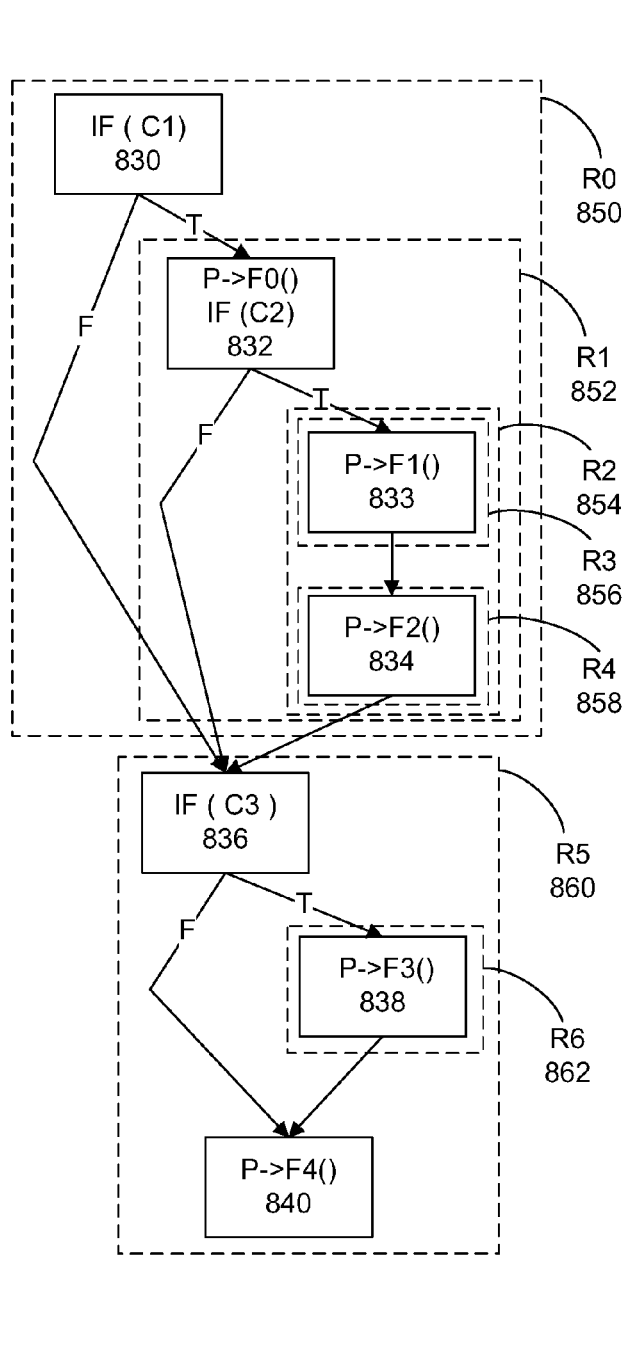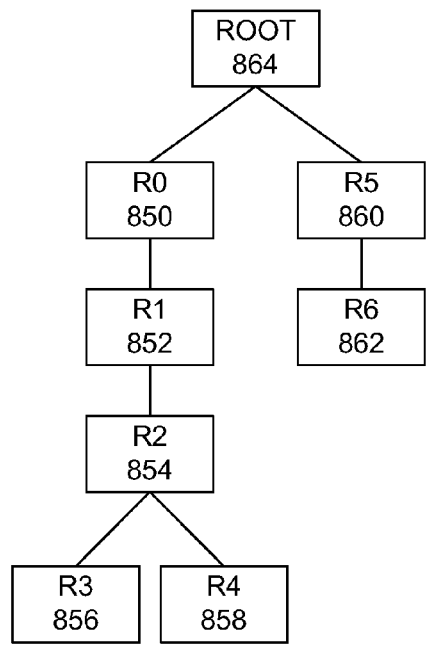
FIGURE 8

GENERATION OF PARALLEL CODE REPRESENTATIONS

BACKGROUND

Multiple core computer architectures have become more common in recent times. Such architectures allow code to be run in parallel. For example, in a dual core architecture, a first core can execute a first set of code in a first thread at the same time that a second core is executing a second set of code in a second thread. The first thread could be running a block of code from a first program and a second thread could be running a block of code from a second program. In addition, it is possible for the two threads to be running two blocks of code from the same program. To allow such parallelism, programs can include parallel code, which includes self-scheduling code that specifies code that can be run in parallel during partial or completely overlapping time periods. A compiler can model control and data dependencies for regions of code in an existing program. The compiler can also codify those dependencies and inject new code back into the program so that when a region of the program completes execution, the program can update a set of dependencies that are relevant to successor regions, if any, in the program. If all the dependencies of a successor code region are fulfilled, then the self-scheduling code can initiate that successor to run as a task. This code that initiates successor regions in the program is referred to herein using the terms "self-scheduling code," "code that is configured to self-schedule," or similar terms. Many existing programs are written as sequential programs that do not include parallel code.

SUMMARY

Whatever the advantages of previous code generation tools and techniques, they have neither recognized the parallel code generation tools and techniques described and claimed herein, nor the advantages produced by such tools and techniques. For example, the tools and techniques can perform acts that can include translating existing source code to self-scheduling parallel source code; displaying potentially parallel regions with their dependencies in a visual editor; and generating self-scheduling parallel executable object code. In some implementations, all these acts may be done automatically and may be done at once. In other implementations, only some of these acts may be done, or they may not be done at once. For example, a self-scheduling parallel intermediate compiler representation can be generated from existing source code. That intermediate compiler representation may be used for different purposes, such as to generate parallel object code, to generate parallel source code, and/or to provide a data structure for visual editing.

Accordingly, the tools and techniques described herein can allow existing source code to be converted to modified representations of the existing source code. The modified representations can include parallel code that is configured to self-schedule regions of the code to run in parallel as tasks. The representations can take various forms, such as modified source code, intermediate compiler formatted code that can be grouped to represent the source code at a higher level, etc.

In one embodiment, the tools and techniques can include abstracting existing source code and representing the source code at a higher level (e.g., as functional blocks). This higher level representation can be analyzed to identify regions of the source code (e.g., functional blocks or groups of functional blocks) that can run in parallel. Moreover, self-scheduling code can be inserted into the regions to schedule the regions to run in parallel as tasks. A modified higher level representation with such inserted code can be translated back into modified source code that is configured to self-schedule the regions to run in parallel as a set of tasks.

The higher level representation can be referred to as a grouped representation of existing source code. As used herein, a grouped representation of source code is a representation that identifies groups of the source code, such as basic blocks, loops, exception handling routines, user-defined regions, and/or single entry single exit regions. The grouped representation can define regions of the existing source code. A set of the regions that can run in parallel can be identified based on the grouped representation. The grouped representation can be converted into modified source code that is configured to self-schedule the set of regions in parallel as a set of tasks.

In another embodiment of the tools and techniques, existing source code that includes one or more exception handling routines can be received. The existing source code can be automatically converted into a modified representation of the existing source code that is configured to self-schedule a set of regions from the existing source code as a set of tasks to run in parallel.

In yet another embodiment of the tools and techniques, user input can identify in one or more lambda expressions a set of regions of existing source code. The one or more lambda expressions can identify the regions as regions that can run in parallel. Moreover, a modified representation of existing source code can be produced. The modified representation can be configured to self-schedule the set of regions to run in parallel as a set of tasks. A lambda expression defines and constructs one or more unnamed function objects, which behave like handwritten function objects. Lambda expressions will be discussed in more detail in the Written Description section below.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

BRIEF DESCRIPTION OF THE DRAWINGS

FIG. 8 is a block diagram of a control flow graph with single entry single exit regions dashed, and a corresponding single entry single exit region graph.

DETAILED DESCRIPTION

Figure 1:
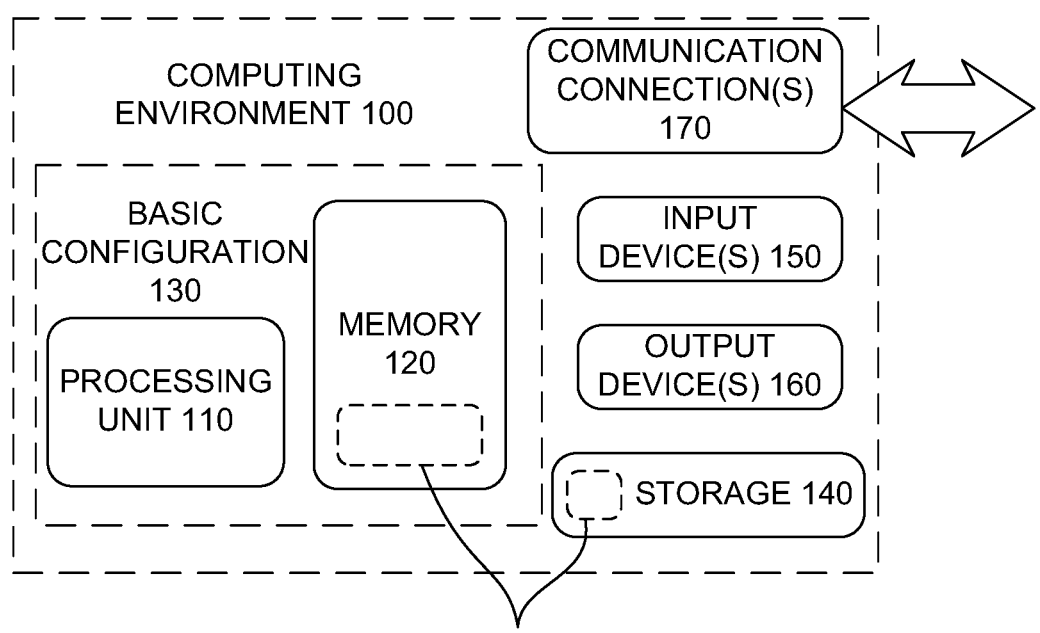
FIG. 1 is a block diagram of a suitable computing environment in which one or more of the described embodiments may be implemented.

Embodiments described herein are directed to techniques and tools for improved generation of parallel representations (i.e., representations of existing source code that are configured to self-schedule a set of code regions to run as a set of tasks in parallel when the representations are resolved or executed, possibly after being compiled) from source code. Such improvements may result from the use of various techniques and tools separately or in combination.

Such techniques and tools may include converting sequential source code into a modified parallel representation of the source code, which can include self-scheduling code to schedule regions of code to run in parallel as tasks. Grouped representations of the existing sequential source code may be generated and analyzed to identify these regions of code that can run in parallel. For example, sequential code may be abstracted to generate one or more grouped representations, such as a control flow graph and a hierarchical task graph. The grouped representations can be analyzed to identify regions of the code that can run in parallel. Self-scheduling code can be injected into the regions in an intermediate compiler representation of the sequential code to form a parallel intermediate compiler representation. That intermediate compiler representation can be translated into a parallel source code representation that includes such self-scheduling code to schedule the regions to run in parallel as tasks. In addition, the parallel source code representation and/or the parallel intermediate compiler representation may be compiled into object code that includes the self-scheduling code. The generation of parallel representations may account for exception handling routines, such as by keeping such routines together, rather than splitting them across multiple tasks or threads. In addition, optimization techniques can be employed when generating parallel representations. For example, variables can be privatized to allow for additional parallelism in the parallel representations. These techniques can be completely or partially automated, such as by being performed automatically in a compiler computing environment. Thus, the techniques and tools described herein can allow sequential code to be effectively and efficiently converted to parallel representations that may be translated back into source code and/or compiled into object code that can reap the benefits of multi-core computer architectures.

Accordingly, one or more substantial benefits can be realized from the parallel representation generation tools and techniques described herein. However, the subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts may not show the various ways in which particular techniques can be used in conjunction with other techniques.

I. Exemplary Computing Environment

FIG. 1 illustrates a generalized example of a suitable computing environment (100) in which one or more of the described embodiments may be implemented. For example, one or more such computing environments can be used as a compiler computing environment (i.e., a computing environment that includes one or more source code compiler components) that can generate parallel representations from existing source code. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing generation of parallel representations from source code.

Although the various blocks of FIG. 1 are shown with lines for the sake of clarity, in reality, delineating various components is not so clear and, metaphorically, the lines of FIG. 1 and the other figures discussed below would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable storage media. Computer-readable storage media are any available media that can be accessed within a computing environment. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," "generate," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. General Parallel Code Representation Generation System and Environment

Figure 2:
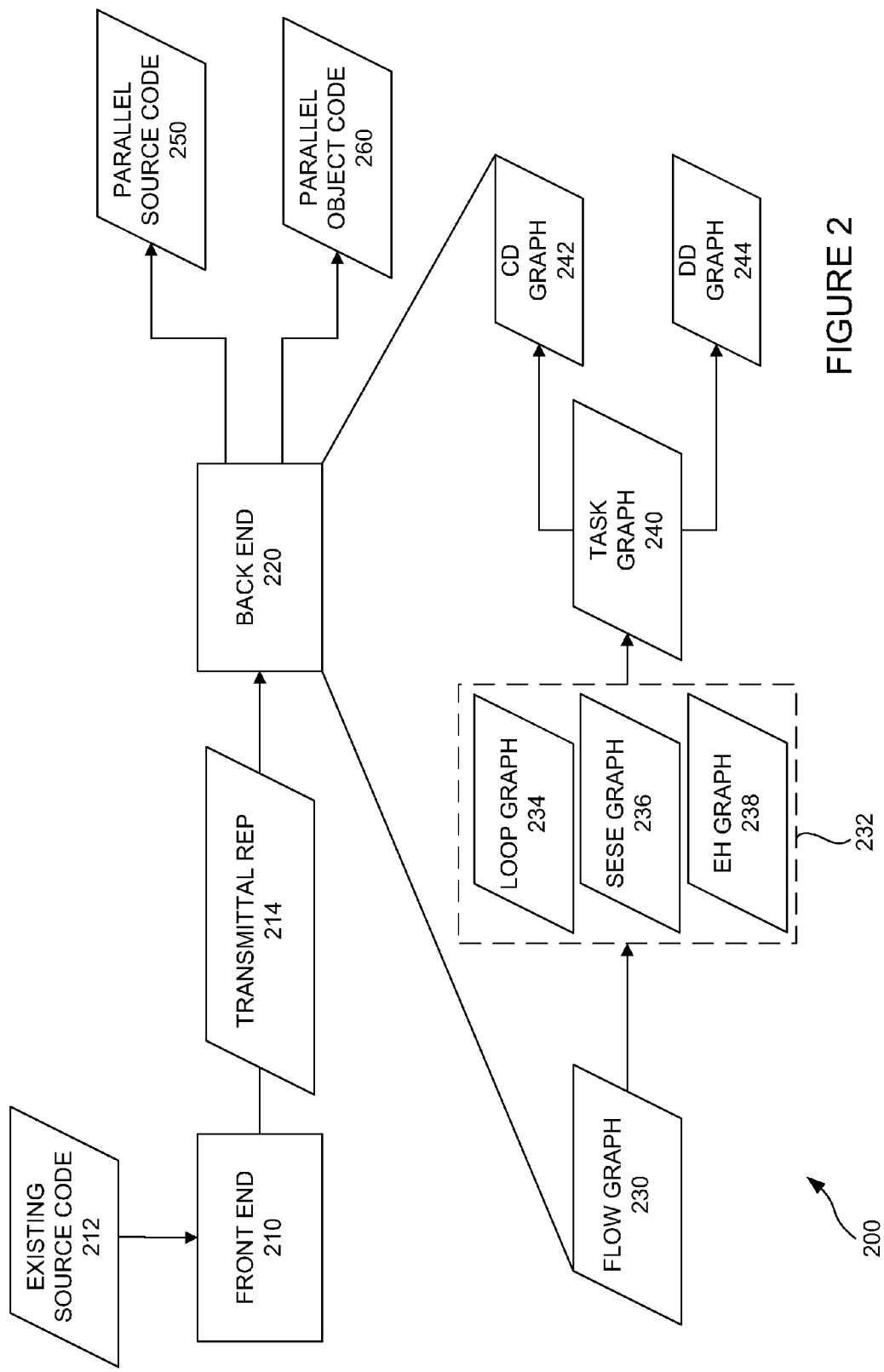
FIG. 2 is a block diagram of a parallel code representation generation environment.

FIG. 2 is a block diagram of a parallel code representation generation environment (200) in conjunction with which one or more of the described embodiments may be implemented. The environment (200) of FIG. 2 can include one or more computing environments, such as the computing environment (100) described above with reference to FIG. 1. In general, the environment (200) of FIG. 2 can generate a standard flow graph of existing source code, discover regions in the flow graph with the same control dependencies and with no data dependencies between them, and include code to schedule those regions as tasks to be run in parallel. As used herein, a graph may be any of various types of data structures that can represent a node structure, such as the structures described herein. This can result in converting existing source code into representations of that source code, such as modified source code and/or modified intermediate compiler representations. A control dependency is a condition that has to be satisfied before a block will run. For example, block X may include an "if" expression that needs to be true for block Y to be executed at runtime. If so, then the "if" expression being resolved to true is a control dependency for block Y. A data dependency occurs when an instruction depends on the data or value result of a previous instruction. Additionally, a data anti-dependency, which is considered herein to be a form of a data dependency, occurs when an instruction requires a value that is later updated by another instruction. The modified representation of the existing source code can include code that automatically schedules regions as tasks, including the auto-scheduling of parallel executing tasks that represent regions of the existing source code.

The generation environment (200) can include a source code compiler front end (210), which can receive existing source code (212). For example, the source code (212) may be entered by a user with a user input device and/or transmitted to the front end (210) in some other manner. The source code (212) can be standard sequential source code, such as standard source code in C++ format, or it may already include some parallel code.

The front end (210) can produce an intermediate transmittal representation (214) of the existing source code (212), which can be passed to a source code compiler back end (220). The front end (210) and the back end (220) can both be part of standard compiler program, such as the compiler in Microsoft's Visual Studio® Dev10 development system. However, the compiler, and especially the back end (220), can include the additional tools and techniques described herein for generating parallel representations of existing source code. Other implementations of the compiler may be possible, such as a compiler that does not have a clear boundary between front end and back end tools and techniques.

The back end (220) can generate a back end intermediate representation of the existing source code (212). For example, the back end representation may be a standard control flow graph (230). Such a flow graph (230) can group code into basic blocks, and can represent the flow between those basic blocks. Using the flow graph (230), the back end (220) can generate one or more region graphs (232), which can also represent the existing source code (212), and can further group together the basic blocks of the flow graph (230) into regions. For example, the region graphs (232) can include a loop graph (234), which can identify regions corresponding to loops (for loops, while loops, etc.) in the existing source code (212). As another example, the region graphs (232) can include a single entrance single exit graph (236), which can identify regions of the existing source code (212) that have a single entry point and a single exit point. As will be explained more below, such single entry single exit regions can correspond to groups of one or more basic blocks that have a control dependence on a common set of one or more other basic blocks. As yet another example, the region graphs (232) can include an exception handling graph (238), which can indicate regions of exception handling routines (e.g., try and catch routines) in the existing source code (212). It can be useful to identify each of these types of regions so that they can be identified as task regions in a task graph (240). Other types of region graphs can also be used. For example, a graph of user-defined regions can be used. Such user-defined regions could include code that is wrapped in user-defined lambda expressions in the existing code. Indeed, some of those lambda expressions in the existing source code (212) could already be configured to schedule some existing code to run in parallel, and additional parallelism could be identified and scheduled using the tools and techniques discussed herein. Lambda expressions will be explained below.

A control dependence graph (242) and a data dependence graph (244) can both be generated by the back end (220). The control dependence graph (242) can map control dependencies of the task regions in the task graph (240), and the data dependence graph (244) can map the data dependencies of the task regions in the task graph (240). The dependence graphs (242 and 244) can be formed as various different types of data structures, such as annotations of the task graph (240) and/or as one or more tables.

Using the task graph (240), the control dependence graph (242), and the data dependence graph (244), the back end (220) can produce a modified parallel representation of the existing source code (212) that is configured to self-schedule the set of task regions of the existing source code (212) as tasks. The modified parallel representation can include code that can track dependencies and can schedule a task region for execution as a task, possibly in parallel with another task region if such parallel execution can be done consistently with the data dependencies of the task regions. For example, the modified representation may be modified parallel source code (250) or a modified parallel intermediate compiler representation of the existing source code (212). Such a modified intermediate compiler representation or the modified parallel source code (250) may be compiled into modified parallel object code (260). For example, the modified intermediate representation may be translated into the modified parallel source code (250), modified parallel object code (260), or both, using standard compiler techniques to compile intermediate representations into object code, and to translate code between intermediate representations such as graphs and source code. Also, the modified parallel source code (250) may be edited by an automated tool or a user prior to being compiled into object code. For example, a user could edit the source code to break dependencies between some task regions and allow for additional parallelism in the resulting code.

III. Generating a Task Graph

A. General Discussion of Generating a Hierarchical Task Graph

As noted above, a control flow graph can be generated in a standard manner. A hierarchical task graph (HTG) can be generated using the flow graph. The HTG can be a directed-acyclic-graph or DAG, which contains no cycles. At the lowest level of abstraction, each node in the HTG can contain (by incorporating, representing, be linked to, etc.) 1 to N nodes, or blocks, in the flow graph. At the next level in the hierarchy, each region node can contain one or more region nodes from the previous level. Successively higher levels of the HTG can be generated until a root node that contains the entire program is generated.

The initial level of the HTG can include task regions, which represent regions of flow graph nodes. For example, the task regions can include call site regions, single entrance single exit regions, loop regions, and exception handling regions. The task regions of the HTG could also represent other types of regions, such as user-defined regions. This first level region HTG can form a DAG. Data-dependence and control dependencies between nodes can be computed at this level.

Another higher level graph can be generated. Each task region in the higher level graph can include one or more of the initial HTG task nodes, including "compound" task regions that reduce the number of nodes and edges (i.e., links between nodes) from those at the previous level. Control and data dependencies can be computed at this level. This technique of adding additional levels with reduced numbers of nodes can be repeated until a level is generated with only one node that includes all the task regions.

When this HTG is complete, it can define task regions that can be scheduled at program execution time as tasks when the dependencies (i.e., prerequisites) for each task region have been completed. The code to check that the dependencies have been honored and the code to schedule the task region itself can be emitted by the compiler, as will be discussed more below. Thus, the compiler can be involved in scheduling task regions to run as tasks.

B. Examples of Generating a Task Graph

An HTG can be generated to identify and handle exception handling routines (e.g., C++ and structured exception handling), loops, single entrance single exit regions, and user specified regions (such as those specified with lambda constructs discussed below). Exception handling routines can complicate flow graphs with try bodies, handlers and asynchronous edges that model flow that "may" happen in the event of a fault at runtime. An exception handling region tree can model containment and adjacency, and can ensure that one entire try with all of its associated handlers is not split across threads.

The HTG can be formed in one traversal of the control flow graph, from the following 3 region graphs: (1) loop region graph (loop graph); (2) exception handling region graph (EH graph); and (3) single entrance single exit region graph (SESE graph). Other region graphs may also be used, such as user-defined region graphs. Such region graphs can be used in the same way as these three region graphs when generating the HTG. The SESE, EH and Loop graphs are referred to as the initial independent region graphs, or region graphs.

The region graphs can be built on top of an ordinary flow graph (such as by including indications of the three types of regions in a tuple associated with each basic block of a flow graph). Thus, each flow graph node can have one edge pointing back into a containing region in the SESE graph; possibly one edge pointing back into a containing region in the EH graph; and possibly one edge pointing back into the loop graph. Typically, all flow graphs nodes will be members of at least one identically control dependent region. It is optional that a flow graph node would be contained in a loop or an exception handling region. Indeed, the existing source code may not include any loops or exception handling routines.

The following sections will provide examples of loops the associated loop graph, single entrance single exit regions and the associated SESE graph, and exception handling routines and the associated EH graph.

Each of the region graphs can form a DAG, and the three DAGs can be used to form one unified region graph for scheduling parallel code: the HTG. Accordingly, after examples of the region graphs are discussed, an example of a technique for walking the flow graph (whose nodes are annotated with pointers to the three region graphs) and generating the HTG will be explained. The HTG can be used to form task regions that can be dispatched as machine code tasks at runtime and/or used to generate parallel source code, such as parallel C++ source code.

1. Loops and the Associated Loop Graph

Figure 3:
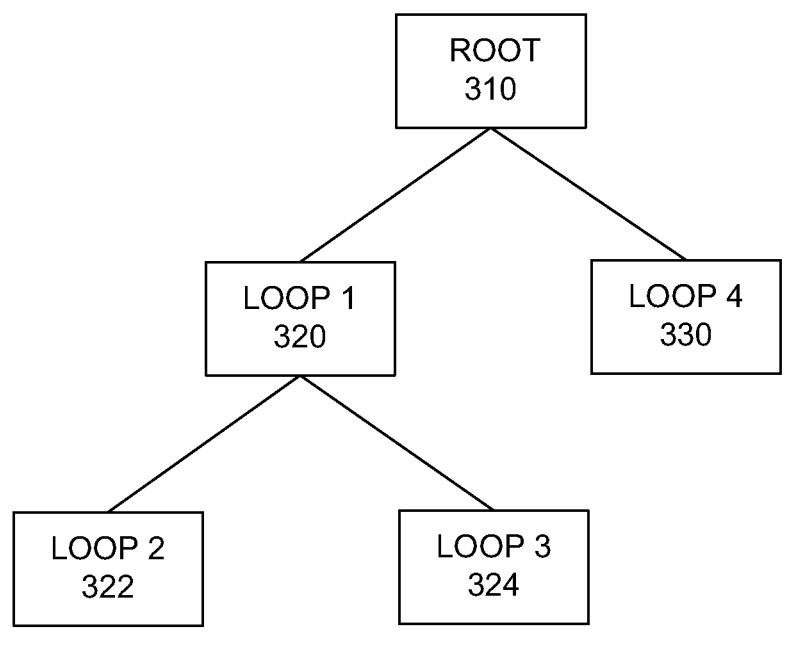
FIG. 3 is a block diagram of a loop region graph.

Loops and loop graphs will be explained with reference to the following C++ source code and the associated loop graph (300) illustrated in FIG. 3.

TABLE 1

```
void main ( )
{
  int i, j, k, A[1000], B[1000], C[1000];
  for (i = 0; i < 1000; i++) // loop 1
  {
    for (j = 0; j < 1000; j++) // loop 2
    {
      A[i] += B[j];
    }
    for (j = 0; j < 1000; j++) // loop 3
    {
      C[i] += A[j];
    }
  }
  for (k = 0; k < 1000; i++) // loop 4
  {
    A[i] = B[i] + C[i];
  }
}
```

As can be seen, the loop graph (300) can be arranged in a hierarchical manner, where a root node (310) includes loop 1 node (320), which includes a loop 2 node (322) and a loop 3 node (324). The loop 1 node (320) corresponds to loop 1 above, and the loop 2 and 3 nodes correspond to loops 2 and 3 above, which are nested in loop 1. Additionally, a loop 4 node (330) is also included in the root node (310). The loop graph (300) reveals that loop 2 and loop 3 might be able to run in parallel, or loop 1 and loop 4 might be able to run in parallel. Accordingly, the loop graph (300) can begin to reveal information about possible ways to partition the program to exploit parallelism. Additional information and analysis can be used to determine what parallelism actually exists in the example. This additional information and analysis could include determining whether there is any exception handling in or around these loops, and whether there is any control dependence that determines whether a particular loop will ever execute. The following discussion will explain some of this analysis, as it relates to exception handling and control dependence.

2. Exception Handling and Associated EH Graph

Different types of exception handling routines may exist in code. Two examples are structured exception handling and C++ exception handling. Such exception handling routines will now be discussed, followed by a discussion of techniques for dealing with such exception handling routines using an EH graph.

Following this paragraph is an example of structured exception handling (SEH). Note that control flow may go to the handler, or it may flow around the handler. Accordingly, the control-flow-graph for this C++ function could be complicated by the exception handling, such as by having an edge type that captures the semantic of a possible rare event like divide by zero.

TABLE 2

```
BOOL SafeDiv(INT32 dividend, INT32 divisor, INT32 *pResult)
{
  __try
  {
    *pResult = dividend / divisor;
  }
  __except(GetExceptionCode( ) ==
  EXCEPTION_INT_DIVIDE_BY_ZERO ?
      EXCEPTION_EXECUTE_HANDLER :
      EXCEPTION_CONTINUE_SEARCH)
  {
    Printf("I'm in the handler becuase divisor was zero,
    *pResult is garbage\n");
  }
  return TRUE;
}
```

Following is an example of C++ exception handling (CEH), where "MyFunction( )" might throw an object of a certain type, where the object would be caught by a catch routine.

TABLE 3

```
int main( )
{
  cout << "In main." << endl;
  try
  {
    cout << "In try block, calling MyFunc( )." << endl;
    MyFunc( );
  }
  catch( CTest E )
  {
    cout << "In catch handler." << endl;
    cout << "Caught CTest exception type: ";
    cout << E.ShowReason( ) << endl;
  }
  catch( char *str )
  {
    cout << "Caught some other exception: "<< str << endl;
  }
  cout << "Back in main. Execution resumes here." << endl;
  return 0;
}
```

In the above example, the handler that is chosen for an exception in the try body is dependent on the "type" of the exception. Thus, the underlying flow graph for the function main( ){ ... } can be even more complex because control may: (1) transition from the try body to the lexically first handler and then the last cout and return; (2) transition from the try body to the lexically second handler and then the last cout and return; (3) transition from the try body, never throw an exception object, and then execute the last cout( ) and return 0.

These types of exception handling routines can get more complicated if a handler can re-throw an exception, causing more complex flow graphs with more possible edges between basic blocks. For example, a throw expression with no operand can re-throw the exception currently being handled, where the re-thrown exception object is the original exception object, rather than a copy. Such a re-throw expression typically appears only in a catch handler or in a function called from within a catch handler. Following is an example of an exception handling routine with such a re-throw expression:

TABLE 4

```
Try
{
  throw CSomeOtherException( );
}
catch(...)   // Handle all exceptions
{
  // Respond (perhaps only partially) to exception
  throw;    // re-throw, passing same exception to some other handler
}
```

Figure 4:
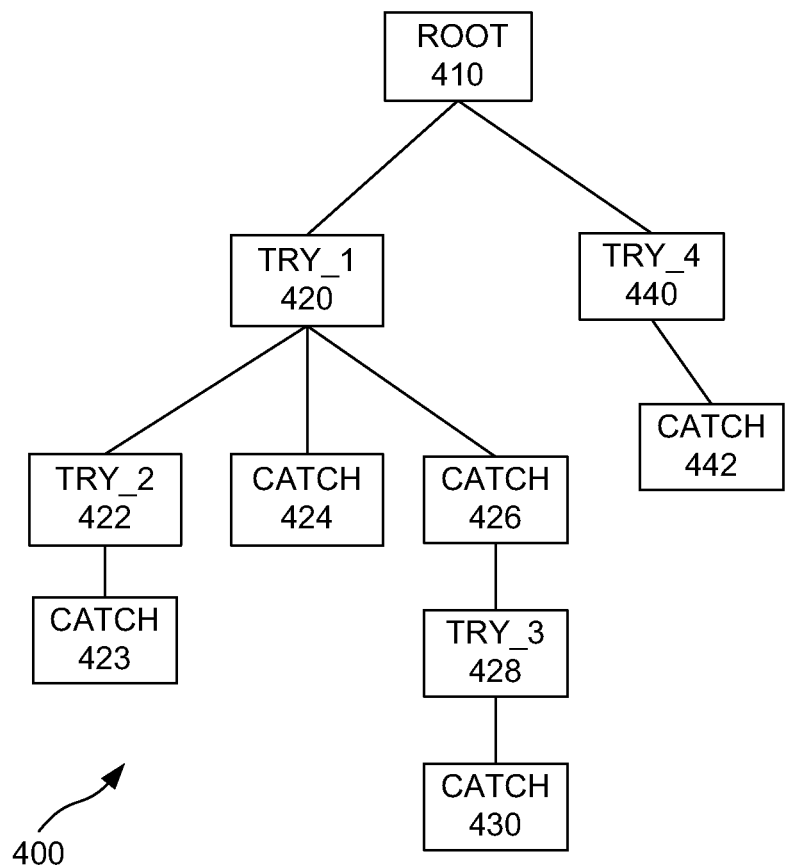
FIG. 4 is a block diagram of an exception handling region graph.

Because exception handling routines are common in system programs and commercial applications, it can be useful to deal with the resulting complexities of such routines in order to provide a general technique for generating parallel representations of source code. Accordingly, an EH region graph with an arbitrarily complex C++ exception handling construct reproduced below will be discussed with reference to FIG. 4.

TABLE 5

```
int main( )
{
  cout << "In main." << endl;
  try   // TRY_1
  {
    cout << "In try block, calling MyFunc( )." << endl;
    try   // TRY_2
    {
      MyFunc( );
    }
    catch (...)
    {
      throw;
    }
  }
  catch( CTest E )
  {
    cout << "In catch handler." << endl;
    cout << "Caught CTest exception type: ";
    cout << E.ShowReason( ) << endl;
  }
  catch( char *str )
  {
    cout << "Caught some other exception: "<< str << endl;
    try   // TRY_3
    {
    }
    catch (...)
    {
    }
  }
  try   // TRY_4
  {
  }
  catch (...)
  {
```

TABLE 5-continued

```
  }
  cout << "Back in main. Execution resumes here." << endl;
  return 0;
}
```

The example above includes four try routines, labeled TRY_1, TRY_2, TRY_3, and TRY_4. This example can be modeled by the EH region graph (400) of FIG. 4. The EH graph (400) includes a root node (410). The root node (410) can include basic blocks that are not nested within try bodies or handlers. The root node can thus include a TRY_1 node (420) corresponding to the try routine labeled TRY_1 above because the TRY_1 routine is not nested within other try bodies or handlers. The TRY_1 node (420) can include a TRY_2 node (422) corresponding to the TRY_2 routine above because the TRY_2 routine is nested within the TRY_1 routine. A catch routine is nested within the TRY_2 routine, so the TRY_2 node (422) can include a corresponding catch node (423). Additionally, two catch routines are nested within the TRY_1 routine above, so the TRY_1 node (420) can include corresponding catch nodes (424 and 426). One of those catch nodes (426) can also include a TRY_3 node (428) corresponding to the TRY_3 routine above because that try routine is nested within the corresponding catch routine above. Additionally, the TRY_3 node (428) can include a catch node (430) corresponding to a catch routine nested within the TRY_3 routine above. Also, the root node (410) can include a TRY_4 node (440), and a catch node (442) nested within the TRY_4 node (440). Basic blocks outside of a try body or a handler (e.g., a catch routine) can be considered members of the root node (410). The control flow graph for the example above can have pointers from the basic blocks back into the corresponding nodes in this EH graph (400).

Useful information can be gleaned from the EH graph (400). For example, it can be seen that the TRY_1 and TRY_4 are adjacent, that TRY_3 is nested in a handler that is associated with TRY_1, and that TRY_1 is the only try body in the example that has 2 possible handlers. When generating the HTG, the EH graph can be used to pull off threads that are buried in exception handling routines (exception handling regions, such as try routines and handling (e.g., catch) routines) for inclusion as task regions in the HTG.

3. Single Entrance Single Exit Regions and Associated SESE Graph

The previous explanations of the loop graph and the EH graph were illustrated with source code, and showing how the graphs are generated from nested loops or exception handling routines in that source code. For illustrating the single entrance single exit regions in an SESE graph, a flow graph and a corresponding control dependence graph will be illustrated and discussed. To generate the SESE graph, the compiler can walk the control dependence graph (which can be used for code generation) and then form the single entrance single exit regions from that walk.

To state control dependence informally, a basic block Y is directly control dependent on basic block X if: (1) following one edge out of X will eventually execute Y; (2) the only way out after taking this edge is through Y; and (3) choosing some other edge out of X may avoid Y. In other words, node X will determine whether node Y will execute. A more formal statement of this relationship is that a basic block Y is directly control dependent on a basic block X if: (1) Y post dominates some successor of X; and (2) Y does not post dominate all successors of X.

Figure 5:
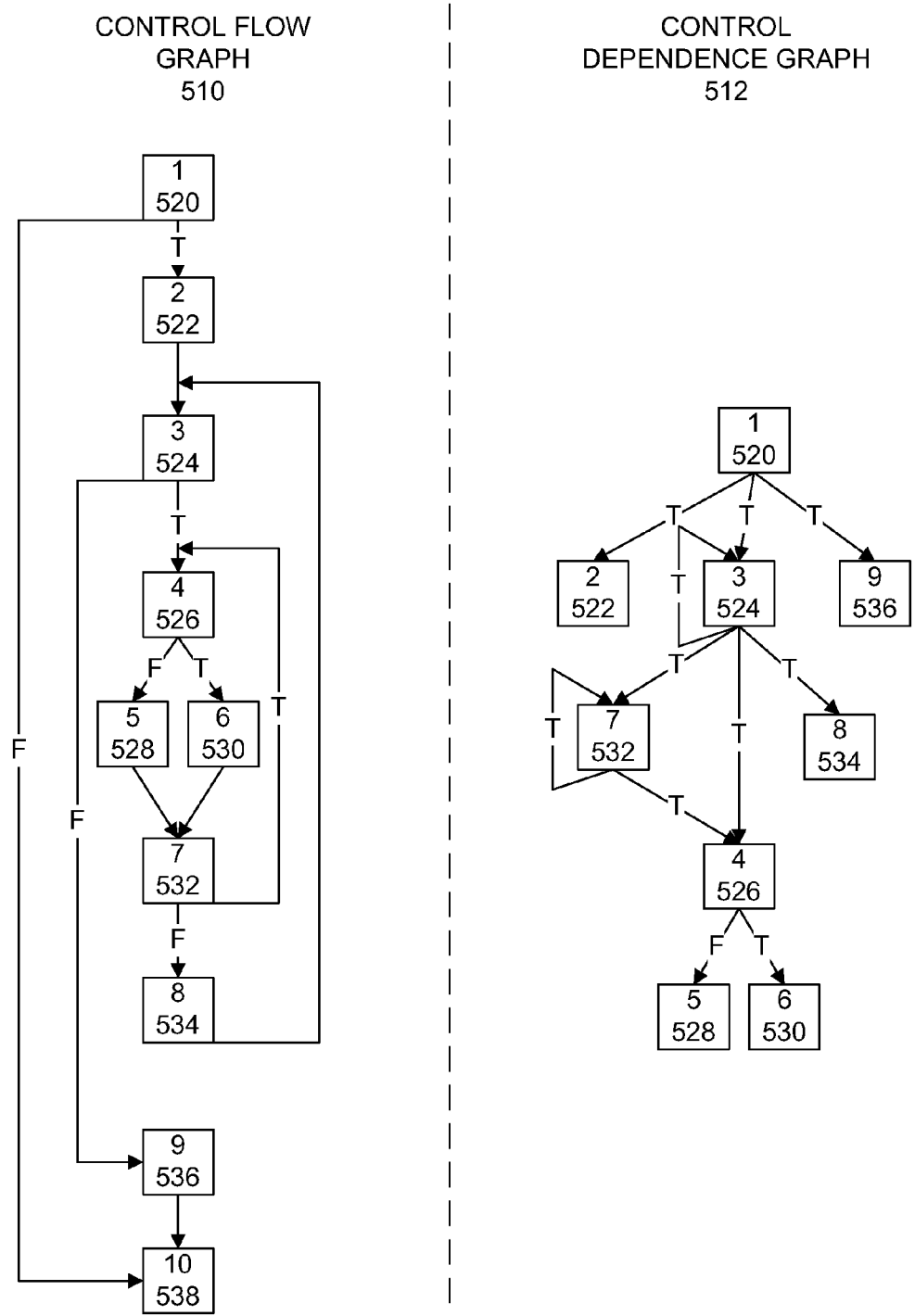
FIG. 5 is a block diagram of a control flow graph and a corresponding control dependence graph.

Referring now to FIG. 5, a control flow graph (510) (illustrated on the left side of FIG. 5) will be discussed along with its associated control dependence graph (512) (illustrated on the right side of FIG. 5). The control flow graph (510) represents the flow of ten basic blocks: block 1 (520), block 2 (522), block 3 (524), block 4 (526), block 5 (528), block 6 (530), block 7 (532), block 8 (534), block 9 (536), and block 10 (538). From the flow graph (510) it can be seen that block 2 (522), block 3 (524), and block 9 (536) will execute if and only if the condition in block 1 (520) is true. Accordingly, block 2 (522), block 3 (524), and block 9 (536) depend directly from block 1 (520) in the control dependence graph (512), as illustrated by the arrows extending directly from block 1 (520) to block 2 (522), block 3 (524), and block 9 (536).

Block 3 (524) contains an iteration test for a loop that includes block 3 (524), block 4 (526), block 5 (528) or block 6 (530), block 7 (532), and block 8 (534). Accordingly, block 3 (524), block 4 (526), block 7 (532), and block 8 (534) will execute (or execute again) if and only if the condition in block 3 (524) is true. Accordingly, block 3 (524), block 4 (526), block 7 (532), and block 8 (534) depend directly from block 3 (524) in the control dependence graph (512). For block 3 (524), the dependence on itself is illustrated in the control dependence graph (512) by the arrow extending from the bottom of block 3 (524) around and to the top of block 3 (524).

Block 7 (532) contains an iteration test for a loop that includes block 4 (526), block 5 (528) or block 6 (530), and block 7 (532). Accordingly, block 4 (526) and block 7 (532) will execute again if and only if the condition in block 7 (532) is true, and block 4 (526) and block 7 (532) depend directly from block 7 (532) in the control dependence graph (512). Note that the inner loop that includes block 4 (526), block 5 (528) or block 6 (530), and block 7 (532) is a loop, such as a do-while loop, that will execute once before the condition for the loop is evaluated. In contrast, the outer loop that includes block 3 (524), block 4 (526), block 5 (528) or block 6 (530), block 7 (532), and block 8 (534) is a loop that will not execute at all if the condition in block 3 (524) is initially false.

Additionally, block 5 (528) will execute if and only if the condition in block 4 (526) is false, and block 6 (530) will execute if and only if the condition in block 4 (526) is true. Accordingly, block 5 (528) and block 6 (530) both depend directly from block 4 (526) in the control dependence graph (512).

In addition to the direct dependencies, the control dependence graph can reveal indirect dependencies between blocks. A block X is indirectly control dependant on another block Y if taking one of multiple possible edges out of block Y may, but will not necessarily, lead to the execution of block X. For example, referring to FIG. 5, if the condition in block 3 (524) is true, that condition is necessary for block 6 (530) to execute, but it is insufficient. This is because the condition in block 4 (526) also has to be true for block 6 (530) to execute. In the control dependence graph, a second block is indirectly control dependent on a first block if there is no line extending directly from the first block to the second block, but there is a path of lines extending from the first block, through one or more other blocks, and to the second block. For example, a path of lines extend from block 3 (524), through block 4 (526), and to block 6 (530), so block 6 (530) is indirectly control dependent on block 3 (524).

Note that block 10 (538) does not appear in the control dependence graph (512) because block 10 (538) is the last block and block 10 (538) is always executed. Accordingly, no other blocks depend on block 10 (538), and block 10 (538) does not depend on any other blocks.

From the control dependence graph, the single entrance single exit regions can be generated. These are regions that all share a common set of control dependence edges. In other words a single entrance single exit region includes a set of blocks, where each block in the set has the same control dependency (directly or indirectly) on at least one common block. Note that each region with this common control dependency can also be a single entrance single exit region of blocks in a corresponding flow graph.

To produce the SESE graph, the control dependence graph can be walked in a depth-first-order, while noting the current edge (with its label) on a state stack. The current stack of control dependence edges (from the root node of the control dependence graph to the current block in the walk) forms a set of labels for the block that the walk is entering. A set of nodes with a common "label" (i.e., a common edge in the control dependence graph) can form a SESE region.

Figure 6:
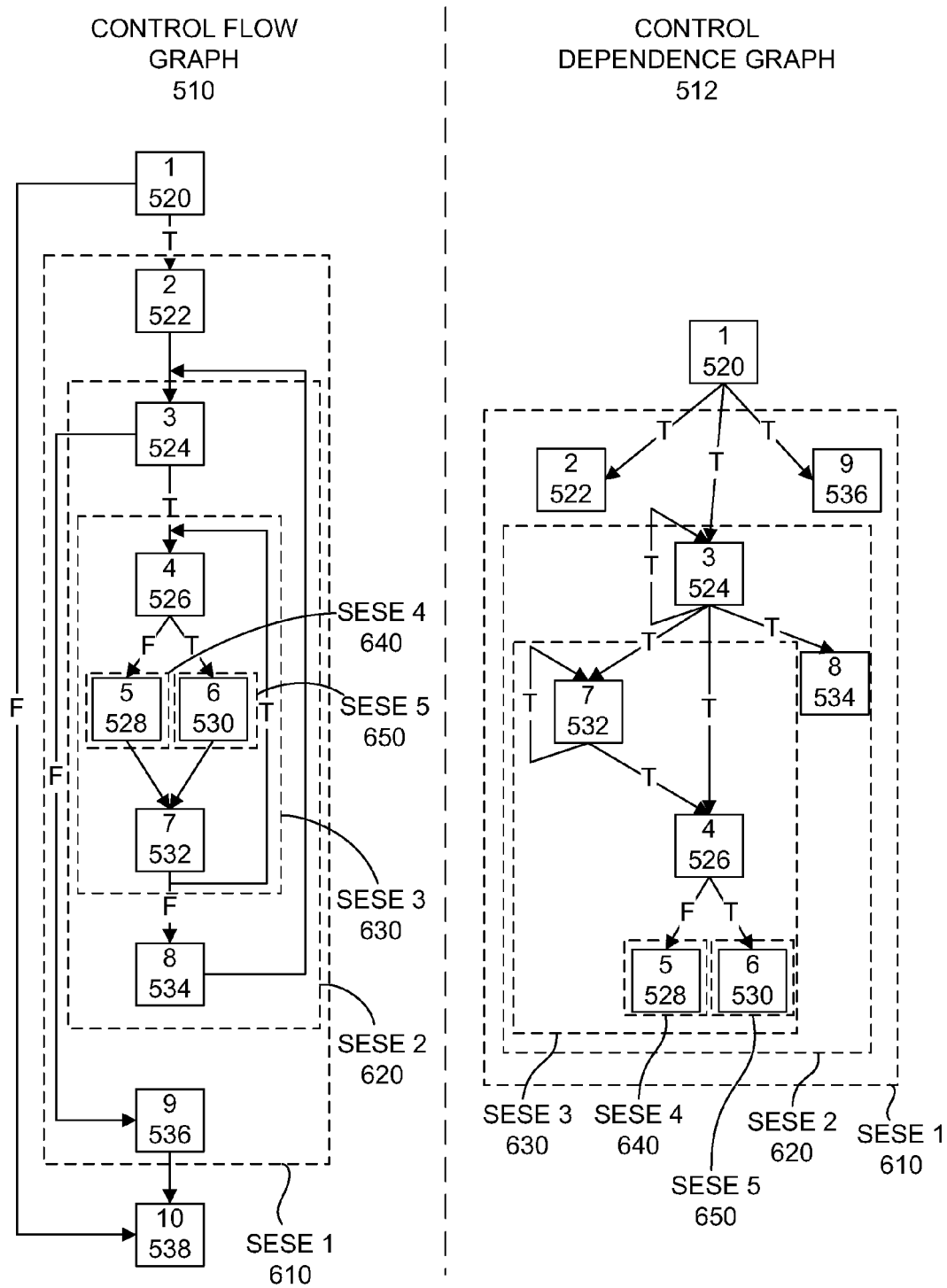
FIG. 6 is a block diagram similar to FIG. 5, with regions circumscribed in dashed lines.

Referring now to FIG. 6, the control flow graph (510) and the control dependence graph (512) of FIG. 5 are shown with single entrance single exit regions being circumscribed with dashed lines or boxes. As is illustrated, a region, SESE 1 (610), includes block 2 (522), block 3 (524), block 4 (526), block 5 (528), block 6 (530), block 7 (532), block 8 (534), and block 9 (536), all of which are control dependent (either directly or indirectly) on the condition in block 1 (520) being true. Another region, SESE 2 (620), includes block 3 (524), block 4 (526), block 5 (528), block 6 (530), block 7 (532), and block 8 (534), all of which are control dependent (either directly or indirectly) on the condition in block 3 (524) being true. Another region, SESE 3 (630), includes block 4 (526), block 5 (528), block 6 (530), and block 7 (532), all of which are control dependent (either directly or indirectly) on the condition in block 7 (532) being true. Another region, SESE 4 (640), includes block 5 (528), which is control dependent on the condition in block 4 (526) being false. Yet another region, SESE 5 (650), includes block 6 (530), which is control dependent on the condition in block 4 (526) being true.

As one example of how the block labels correspond to the regions, the basic blocks in SESE 3 (630) would have basic block labels as follows: {1T, 3T, 7T} for block 7 (532), {1T, 3T, 7T, 4F, 5} for block 5 (528), and {1T, 3T, 7T, 4T, 6} for block 6 (530). In these sets of labels, the lowest common label is 7T, so the region head is 7T (i.e., the condition in block 7 (532) being true).

4. Redundancy Between Loops and Single Entrance Single Exit Regions

To reduce complexity, it can be desirable to create an HTG with fewer numbers of nodes and edges. Note that there can be redundancy between the single entrance single exit regions and loop regions. This redundancy can be avoided when generating the HTG by creating a priority and using only the redundant region with the highest priority. For example, exception handling regions can have highest priority, then loop regions, and then single entrance single exit regions.

In understanding why such redundancies can exist, consider that single entrance single exit regions are a property of edges, rather than nodes. Likewise, loops are a property of edges, not nodes. Loops can be identified from a flow graph by identifying an edge whose source is a block with a depth-first-order number that is greater than or equal to the depth-first-order number of the destination block. Single entrance single exit regions can be demarcated by edges as well. Two edges (A and B) demarcate single entrance single exit region if: (1) A dominates B (every execution path to B includes A); (2) B postdominates A (every execution path from A to program exit includes B); and (3) every loop containing A also contains B, and every loop containing B also contains A.

Figure 7:
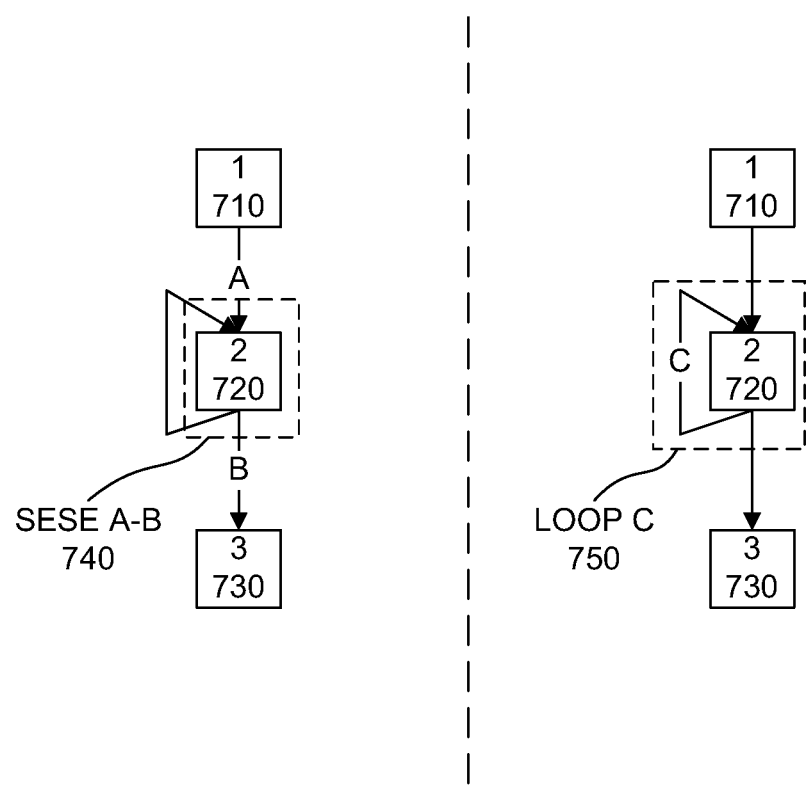
FIG. 7 is a block diagram of a control flow graph, with a single entry single exit region illustrated on the left and a loop region illustrated on the right.

Referring now to FIG. 7, a flow graph is illustrated with block 1 (710), block 2 (720), and block 3 (730). As illustrated on the left side, edge A from block 1 (710) to block 2 (720) and edge B from block 2 (720) to block 3 (730) define a single entrance single exit region SESE A-B (740) that includes only block 2 (720). In addition, as illustrated on the right, edge C from the exit of block 2 (720) to the entrance of block 2 (720) defines a loop region LOOP C (750) that also includes only block 2 (720). Accordingly, region SESE A-B (740) and region LOOP C (750) are redundant.

The loop and single entrance single exit regions are used to map the regions to task regions, so that the compiler can generate the code to schedule the task regions as tasks or threads at runtime when the proper dependencies have been satisfied. A loop that is not a single entrance single exit region can be difficult to map to a thread. For example, such a loop may have several early exits with variables that are live on those exits. Mapping this onto a thread could be difficult, especially if it also involved exception handling.

If an HTG was being generated from these two regions, the generation could favor region LOOP C (750) over region SESE A-B (740) by ignoring region SESE A-B (740) for purposes of the HTG. Exception handling regions can take priority over loop regions, and loop regions can take priority over single entrance single exit regions. This assumption can eliminate useless concentric regions in the HTG.

Single entrance single exit regions can be useful to find parallelism in functions that contain no loops and no exception handling. Consider the code below and the corresponding flow graph (810) and SESE region graph (820) in FIG. 8. (Note that the code in FIG. 8 and the other figures is all upper case solely for formatting purposes.) As can be seen in the flow graph (810), the code includes a number of blocks (830, 832, 833, 834, 836, 838, and 840) in straight line code with no loops. However, there are several single entrance single exit regions: R0 (850), R1 (852), R2 (854), R3 (856), R4 (858), R5 (860), R6 (862), and a root region (864).

TABLE 6

```
Void foo (MyClass *p) {
    if (c1) {
        p->F0( );
        if (c2) {
            p->F1( );
            p->F2( );
        }
    }
    if (c3) {
        p->F3( );
    }
    p->F4( );
}
```

Note that it might be possible to run R3 (856) and R4 (858) in parallel if the inter-procedural information proves data independence between the regions (i.e., if p→F1( ) does not write data that p→F2( ) touches and vice versa). If R4 (858) is data dependent on R3 (856), then it might be possible to go up in the hierarchy and run R0 (850) and R5 (860) in parallel. That level of parallelism would require knowing the control dependence of "if (c1)" and "if (c3)" were satisfied. Thus, the example above contains no loops or exception handling, but the single entrance single exit regions can still be useful to determine whether functional level parallelism is present.

5. Hierarchical Task Graph Example

The three region graphs (which can be DAGs) described above (EH graph, loop graph, and SESE graph) can be used to generate the HTG. The HTG can be generated in one pass over the existing compiler structures that are normally built for optimized sequential code generation, such as a flow graph that is annotated with indications of the regions to which each block in the flow graph belongs.

Figure 9:
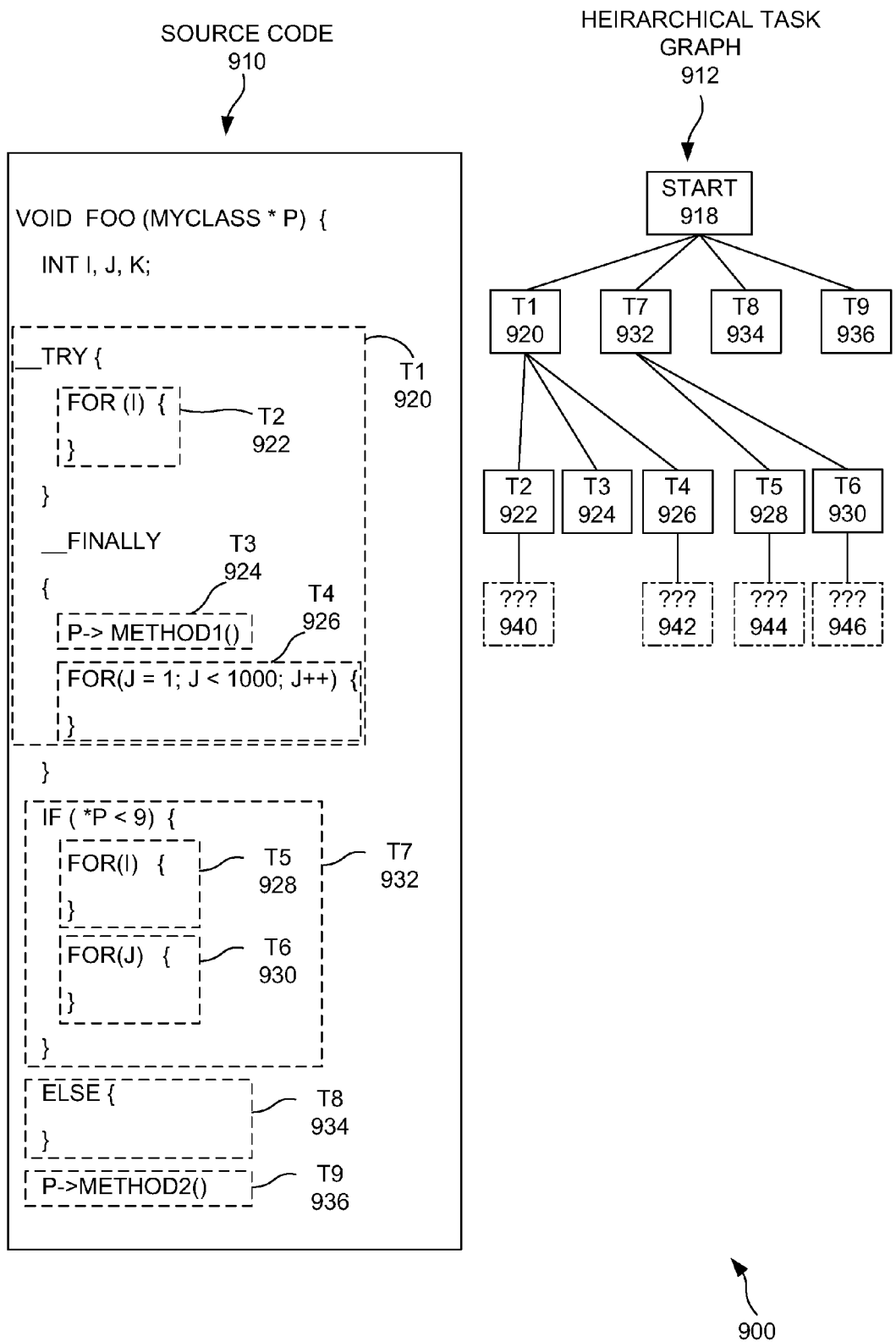
FIG. 9 is a block diagram of source code represented by task regions circumscribed in dashed lines, and a corresponding hierarchical task graph.

Referring now to FIG. 9, source code (910) is shown on the left with task regions circumscribed in dashed lines. A corresponding HTG (912) is shown on the right with regions in a hierarchical configuration. A screen such as FIG. 9 can be displayed to a user, and the user can edit the source code (910), such as to break dependencies between task regions to provide for additional parallelism. For example, a screen such as FIG. 9 could be included in a visual editor display, such as a Microsoft Visual Studio® VC++ IDE screen.

Referring still to FIG. 9, the source code (910) can be automatically grouped into task regions by the compiler, and the task regions can be represented on the HTG (912). The HTG graph (912) can include a root or start node (918). The task regions can include a task region T1 (920) that is an exception handling try region on a level below the start node (918) in the HTG (912). Within the task region T1 (920), and one level below the task region T1 (920) in the HTG (912), are a task region T2 (922) that is a loop region, a task region T3 (924) that is a single entrance single exit region, and another task region T4 (926) that is a loop region. Additionally, below the start node (918) there can be three single entrance single exit task regions: task regions T7 (932), T8 (934) and T9 (936). Also, within the task region T7 (932), there can be two loop task regions T5 (928) and T6 (930) that are one level below the task region T7 (932) in the HTG (912). There may also be additional task regions such as single entrance single exit task regions (940, 942, 944, and 946) corresponding to code that is nested within the bodies of the loop task regions T2 (922), T4 (926), T5 (928), and T6 (930), respectively.

Leaf nodes in the hierarchical task graph, such as T2 (922), T3 (924), T4 (926), T5 (928), and T6 (930), can all be run in parallel as tasks if and only if the control and data dependencies for those task regions are honored. For example, if *p is less than 9, then T8 (934) cannot be run, but T5 (928) and T6 (930) may be able to run in parallel as tasks if there are no data dependencies between these two task regions. Modeling control and data dependencies between the nodes, or task regions, in an HTG will be discussed below.

6. Generating the Hierarchical Task Graph from Region Graphs

In each of the three region graphs, each node can be numbered 1 to N so that each node in the loop graph has its own identifier (1 to N), each node in the EH graph has its own identifier (1 to N), and each node in the SESE region graph has its own identifier (1 to N). Once the flow graph nodes are annotated with pointers back to the three initial region graphs (EH,LOOP,SESE), a function of those basic block links can be used to determine membership of the corresponding blocks in a particular task graph node. A "hash" function can be used while performing a depth-first-walk of the original flow graph to detect when any one of the three links changes when walking from one flow graph node to the next. Such a change can correspond to entering a new HTG task region that will be generated or that has been generated. This generation of the HTG will now be described in more detail.

The following code details a depth-first-ordered traversal of the basic blocks in the control flow graph. This code assumes every block has a bit that has been initialized to indicate that the block has not been visited. This bit can be flipped when the traversal visits the corresponding block. Thus, the traversal can be configured to visit every node only once.

TABLE 7

```
void DFO (Block * b) {
    Foreach_Succ_Block( succ, b) {
        if ( ! succ->visited ) {
            Process(b,succ);      // Build or find the corresponding HTG node
                                  and point this block to it
            DFO(succ);            // Recurse across a flow graph edge
                                  to the next basic block
        }
    }
}
```

Figure 10:
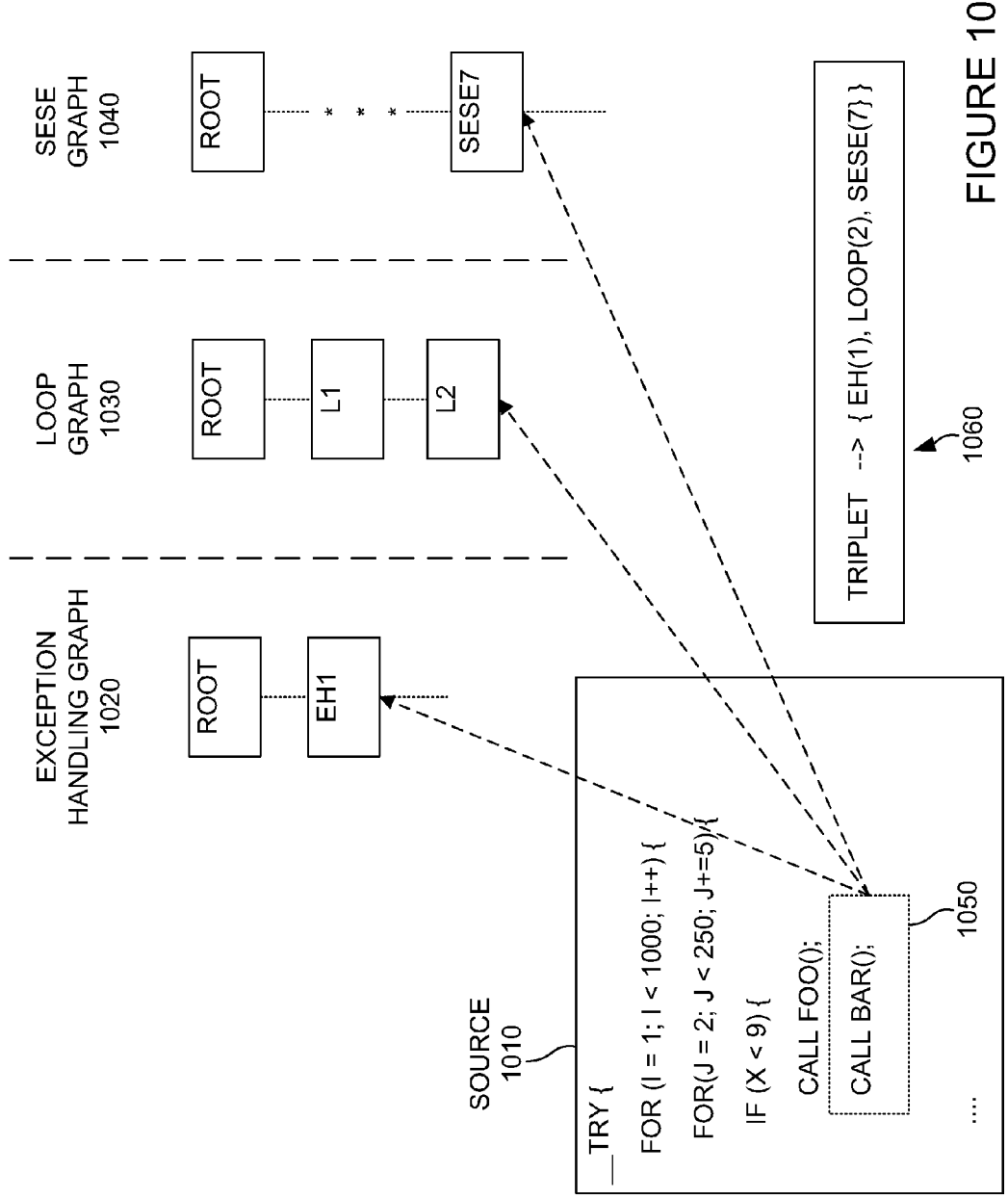
FIG. 10 is a block diagram of existing source code, as well as data structures that can be used to build a hierarchical task graph representing the existing source code.

While recursively traversing the flow graph with the DFO( ) function, the HTG can be incrementally generated using an abstract state machine backed by stacks and the 3 region DAGs. Specifically, the three stacks (corresponding to the three region graphs) can be pushed and popped in the "Process(b,successor)" call. FIG. 10 illustrates existing source code (1010), as well as data structures that can be used in generating a hierarchical task graph representing the source code. These structures can include three region graphs: an EH graph (1020), a loop graph (1030), and a SESE graph (1040). Each block (1050) of the flow graph can be annotated with a triplet (1060), which indicates the lowest level exception handling region from the EH graph (1020), lowest level loop region from the loop graph (1030), and lowest level single entrance single exit region of the SESE graph (1040) to which the block (1050) belongs. This triplet can be used as a hash key to find or create an HTG task region to which the block (1050) belongs.

The actual DFO traversal of the flow graph to generate the HTG will now be discussed. During the traversal of the flow graph, it can be useful to map the triplet (1060) to an HTG node that already exists or is created during the traversal.

An example of code for the DFO traversal is set forth above in Table 7. Following is a sketch for the "Process" function that pushes and pops while creating the HTG. (An example of code for the "Process" function will be set forth below in Table 10.) This function uses the DAG that is formed when building the three initial region graphs.

TABLE 8

```
void Process(Block *source , Block* destination) {
    pop_and_close_htg_regions(3 stacks)    // possibly leaving regions
    push_and_open_htg_regions(3 stacks)   // possibly entering regions
    current_htg_node = LookUp(b, triplet(top_of_stacks(StackPtr))) //
        find or create node
    b->htg = current_htg_node; // generate pointer to HTG node
}
```

In the Process(b,succ) function (where b is the source block in the flow graph and succ is the destination block in the flow graph), three stacks are maintained during the walk or traversal of the flow graph—one stack for each of the initial region graphs. As is indicated in the sketch above, the Process function can involve popping and closing HTG regions (i.e., HTG task regions) if the traversal leaves those regions when traversing from b to succ. Additionally, the Process function can involve pushing and opening HTG regions if the traversal leaves those regions when traversing from b to succ. As has been discussed above, a HTG region is indicated by a combination of entries from the three stacks. Thus, entering a region can involve pushing one or more corresponding region entries onto the top of the one or more of the three stacks, and leaving a region can involve popping to higher level region(s) by removing one or more corresponding regions from the top of one or more of the three stacks. Accordingly, as the traversal exits and enters different flow graph region boundaries, it can also enter or create the appropriate HTG node or task region being entered. Additionally, a hash key can be formed from the triplet, which includes indicators of the three different types of regions that may contain a basic block. Once the basic block is hashed to the correct HTG node using the triplet, the basic block can be linked to that HTG node.

Accordingly, the three stacks corresponding to the three initial types of regions (exception handling regions, loop regions, and single entry single exit regions) can be used to identify corresponding HTG nodes during the traversal. The top of each stack can form a "top of stack" triplet (EH #, Loop #, SESE #) that can be used in the Process(b,succ) function as a key to hash a particular basic block to a node in the HTG. That HTG node may already exist or may be generated as it is needed during the traversal.

Mapping a basic block to an HTG node can include a function that looks up and uses the top-of-stack triplet: HierarchicalTaskNode*nodePtr=LookUp (block, top_of_stack(three_stacks)). This will indicate the triplet corresponding to the current block of the flow graph so long as the three types of initial region nodes are correctly pushed and popped while performing the depth first ordered traversal of the flow graph.

7. An Example of a Three-Region Stack for a GOTO Example

Figure 11:
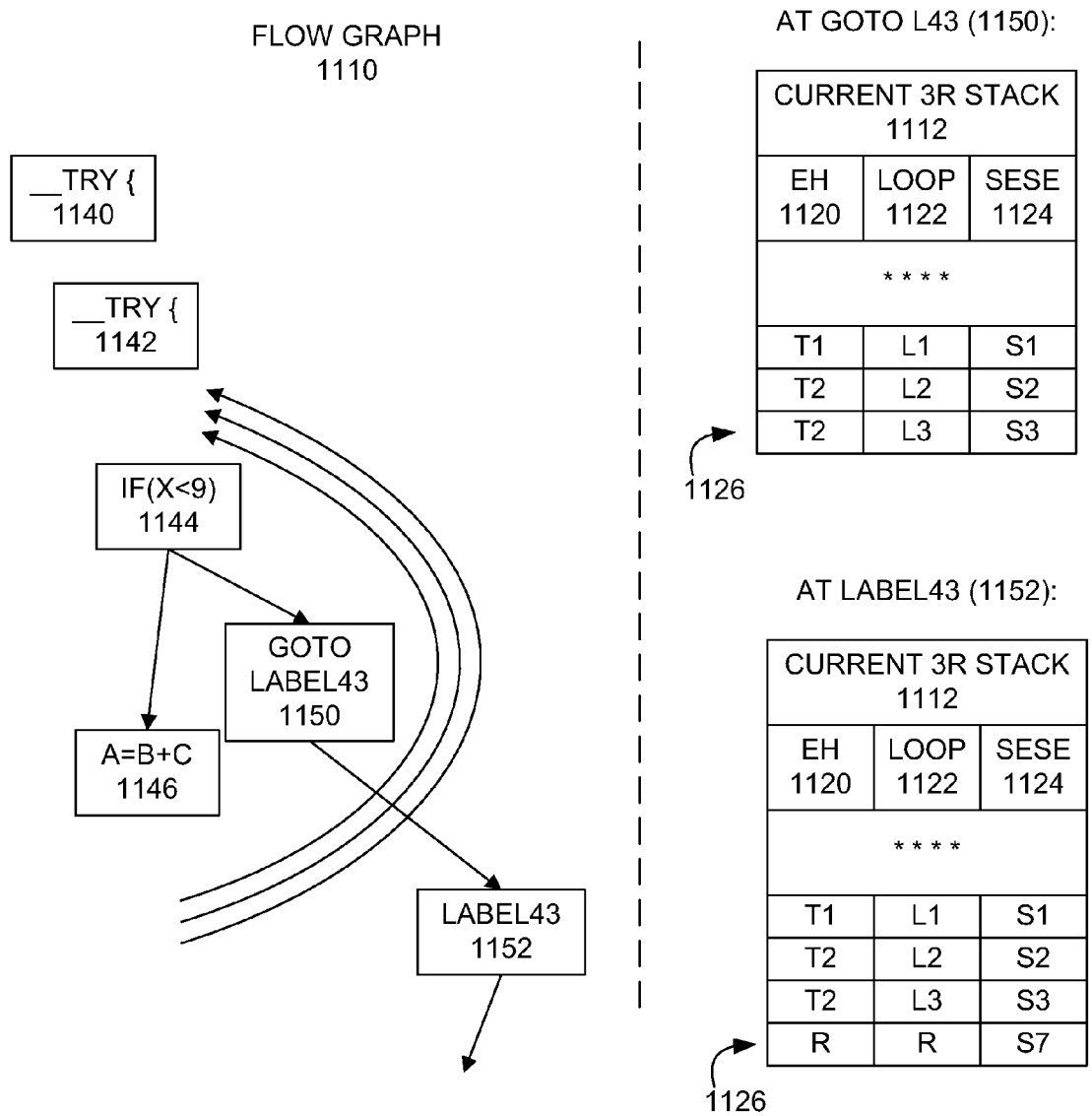
FIG. 11 is a block diagram of a partial control flow graph, and a three-region state stack before and after traversing an edge in the flow graph.

FIG. 11 illustrates a flow graph (1110) on the left and a current three-region stack (1112) on the right. The three-region stack (1112) includes an exception handling region stack (1120), a loop region stack (1122), and a single entry single exit stack (1124). The three-region stack (1112) is illustrated with the stacks building down, so that a "top" (1126) of the three-region stack (1112) is at the bottom of the illustrated table at the right of FIG. 11. The three entries at the top (1126) of the three-region stack (1112) correspond to the triplet formed from the links to the three types of regions in a basic block of a flow graph (1110) that is currently under traversal.

Note that in FIG. 11, nodes of the flow graph (1110) are superimposed over the source code. As illustrated, the flow graph includes a first try basic block (1140), a second nested try basic block (1142). Additionally, nested within the second try basic block (1142) is an "if" basic block (1144). If the "if" basic block (1144) returns false, then an "a=b+c" basic block (1146) can execute. However, if the "if" basic block (1144) is true, then a GOTO basic block (1150) can cause an edge to be taken to a LABEL43 basic block (1152). The LABEL43 basic block (1152) can be outside of the try routines and the three nested loops (indicated by the three curved arrows on the left that contain the basic blocks (1144, 1146, and 1150)). Note that parts of the flow graph (1110) have been omitted in order to focus on maintaining the triplet and the three-region stack (1112) when the traversal takes an edge from the GOTO basic block (1150) to the LABEL43 basic block (1152).

If the depth first ordered traversal walks from the GOTO basic block (1150) to the LABEL43 basic block (1152) and an HTG is being generated while walking the flow graph, then the three-region stack (1112) can capture the scenario that the traversal is leaving two exception handling regions and three loop regions. This can lead to the traversal exiting some corresponding HTG structure that is not yet fully generated (such as the structure for the exception handling regions and loop regions). The traversal can exit those regions, and can later return to those regions and add to them as needed.

The top version of the three-region stack (1112) shows the stack when the traversal is at the GOTO basic block (1150). The tops (1126) of the three stacks (1120, 1122, 1124) form a triplet that indicates that the GOTO basic block (1150) is in an exception handling region T2, a loop region L3, and a single entry single exit region S3. Taking the edge to the LABEL43 basic block (1152) can result in exiting two exception handling regions T1 and T2 and three loop regions L1, L2, and L3. This can be indicated by pushing new root node indicators to the new top (1126) of the exception handling stack (1120) and the loop stack (1122), as well as pushing a new single entrance single exit region S7 to the top (1126) of the single entrance single exit stack (1124). As will be shown below, an alternative could involve removing the exception handling region indicators and the loop region indicators from the stack, and then adding them back in later when the traversal returns to those loop and exception handling regions.

Once the recursion in the depth first ordered traversal function returns back to the split in the flow graph at the "if" basic block (1144), the function can regain the state for that block (i.e., have the three-region stack (1112) indicate the proper containing regions at that point) so that the function can resume adding basic blocks to the correct HTG node under construction. This can be done by removing the new top (1126) of the stack when the edge is recursively taken back from the LABEL43 basic block (1152) to the GOTO basic block (1150), and then resuming normal pushing and popping from that point.

8. An Example of a Hierarchical Task Graph for a Nested Loop Example

To describe the proper maintenance of the three stacks during the DFO routine, an example of the generation of a HTG from an example of loop nested code will be discussed. Consider the following pseudo code for three nested loops that have been bottom tested. The compiler can bottom test a loop in a standard way so that the loop is in a canonical form for loop invariant motion to have a place to always pull invariants, and so that the control flow is optimized for the fewest number of branches upon termination of the loop.

TABLE 9

Before Bottom Testing:
```
while ( i < 100) {
    while (j < 100) {
        while (k < 100) {
            ... Loop body ...
        }
    }
}
A = B + C;
```
Canonical Form After Bottom Testing:
```
if ( i <100) {
L1:
    if (j <100) {
    L2:
        if (k < 100) {
        L3:
            ... Loop body ...
            if (k <100) GOTO L3
        }
        if (j < 100) GOTO L2
    }
    if (i < 100) GOTO L1
}
A = B + C;
```

Note that loop invariant code can be placed just before L3, L2, or L1, depending on the alias information and data dependencies in each loop. Also note that the branch and test is at the bottom of the loop which can result in the shortest code path for loop termination and iteration.

Figure 12:
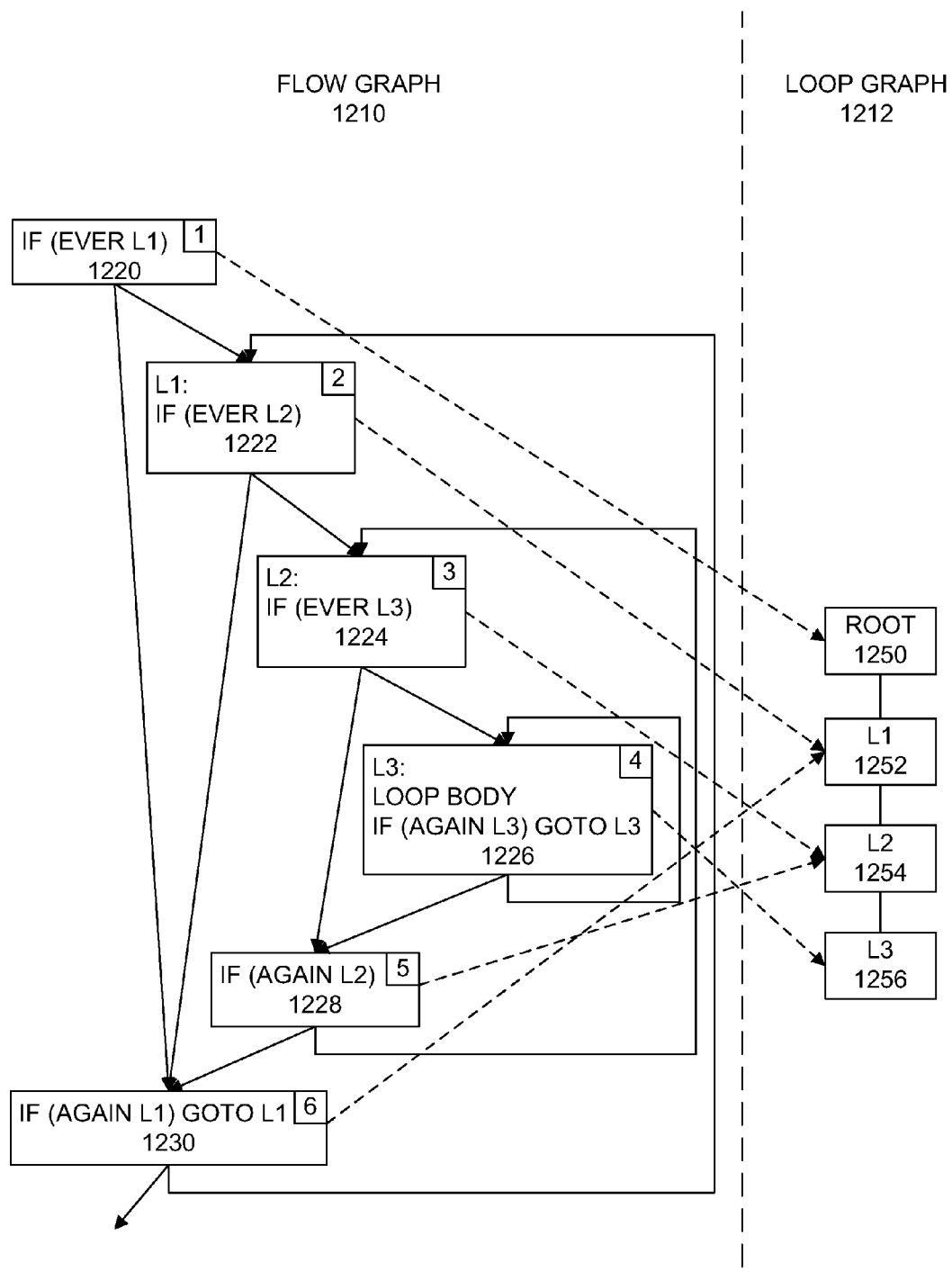
FIG. 12 is a block diagram of a control flow graph and a corresponding loop graph.

FIG. 12 illustrates on the left a flow graph (1210) for the bottom tested pseudo code above. On the right, FIG. 12 illustrates a loop graph (1212) corresponding to the flow graph (1210). The loop graph (1212) can be generated as described above by identifying edges that define loops in the flow graph (1210). For the sake of simplicity, the SESE region graph and the EH region graph for this example will not be discussed. The flow graph can include a block 1 (1220) ("if (ever L1)"), a block 2 (1222) ("L1: if (ever L2)"), a block 3 (1224) ("L2: if (ever L3)"), a block 4 (1226) ("L3: Loop body; if (again L3) GOTO L3"), a block 5 (1228) ("if (again L2)"), and a block 6 (1230) ("if (again L1) GOTO L1"). In this case, the loop graph can include a root region (1250), a loop region L1 (1252) below the root region (1250), a loop region L2 (1254) below the loop region L1 (1252), and a loop region L3 (1256) below the loop region L2 (1254). As indicated by the dashed arrows, block 1 (1220) can point to the root region (1250), block 2 (1222) and block 6 (1230) can point to the loop region L1 (1252), block 3 (1224) and block 5 (1228) can point to the loop region L2 (1254), and block 4 (1226) can point to the loop region L3 (1256). Each block can belong to or be contained by the region it points to, as well as any ancestor regions above that region in the loop graph (1212). In other words, each block can point to the innermost containing node in the loop graph to which the block belongs.

When generating the HTG while performing a random DFO traversal the flow graph (1210), the function can pop and push nodes on the region stacks. This pushing and popping can help ensure that the HTG is constructed so that generating the final HTG results in a mapping from each basic block to the innermost, or lowest level, HTG node containing that basic block.

As an example, the depth first ordered traversal of the flow graph (1210) can traverse the basic blocks in the following order {1 (1220), 6 (1230), . . . , 2 (1222), 3 (1224), 5 (1228), 4 (1226)}, where the recursive descent randomly moves out of the loop at basic block 2 (1222) by going to the successors of block 6 (1230). Leaving the loop nest is represented as the " . . . " in the sequence {1 (1220), 6 (1230), . . . , 2 (1222), 3 (1224), 5 (1228), 4 (1226)}. The recursion can eventually pop back to block 2 (1222) that was previously visited, and continue on to the unvisited node at block 3 (1224), as was discussed in the GOTO example above. The actions to build the HTG during the traversal will be discussed below, without discussing the specifics of leaving the loop nest at block (1222).

9. Least Common Ancestor and Path Graph Concepts

Figure 13:
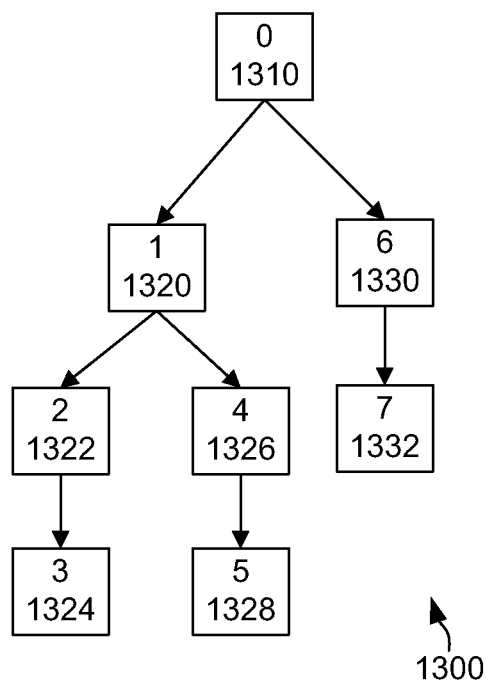
FIG. 13 is a block diagram of a graph used to illustrate least common ancestor and path concepts.

Because the code to form the HTG can use the concepts of a lowest common ancestor (LCA) of two nodes, and of a path of ancestors from a node to another node, those concepts will now be discussed with reference to FIG. 13. FIG. 13 illustrates a general graph (1300), such as a control flow graph. The graph (1300) can have a root node 0 (1310) that points down to a node 1 (1320). In turn, node 1 (1320) can point down to a node 2 (1322), which can point down to a node 3 (1324). Node 1 (1320) can also point down to a node 4 (1326), which can point down to a node 5 (1328). In addition, root node 0 (1310) can point down to a node 6 (1330), which can point down to a node 7 (1332).

The LCA of two nodes is the ancestor that the two nodes have in common that is lowest on the graph. LCA is commutative. For example, in the graph (1300), the LCA of node 3 (1324) and node 5 (1328) is node 1 (1320), i.e., LCA (3,5)=1. As another example, the LCA of node 3 (1324) and node 7 (1332) is root node 0 (1310), i.e., LCA (3,7)=0.

The ancestor path from a source node to a destination node includes the destination node, the LCA of the source and destination nodes, and all nodes in the path between the destination node and LCA of the source and destination nodes. Ancestor path is not commutative. For example, the ancestor path from node 1 (1320) to node 5 (1328) includes node 1 (1320), node 4 (1326), and node 5 (1328), i.e., Path (5←1)={1,4,5}. As another example, the ancestor path from node 3 (1324) to node 5 (1328) is the same as the path from the LCA of node 3 (1324) and node 5 (1328) (which is node 1 (1320)) to node 5 (1328), and that ancestor path includes node 1 (1320), node 4 (1326), and node 5 (1328). In other words, Path(5←3)=Path(5←LCA(5,3)=Path(5←1)={1,4,5}. Path (X←Y) can also be expressed as Path(X,Y), i.e., Path(destination,source).

As will be seen below, LCA and Path can be used to simplify expressions that allow the function for generating the HTG to exploit the nature of the region graphs that are encountered while traversing the basic blocks of the flow graph.

10. Code to Form HTG Region Nodes

Following is an example of code that can be used to do the depth first ordered traversal of the flow graph to produce the HTG. This code can include the following code for a DFO driver that drives the depth first ordered traversal from one block to another, and the process code that performs the traversal:

TABLE 10

```
DFO Driver, i.e., DFO( ):
    void DFO (Block * src_block, Block * curr_block) {
        Foreach_Succ_Block( succ, curr_block) {
            if ( ! succ->visited ) {
                Process(curr_block, succ); // traverse the flow graph edge
                DFO(curr_block, succ);
            }
        }
    }
Processing Edges Between Blocks, i.e., Process( ):
    void Process(Block * src, Block * dest) {
        lca = LCA(dest->regions, src->regions); // find the lowest
        common ancestors
        pop_to(lca);    // possibly exiting regions
        push(PATH(dest,lca));  // possibly entering regions
        current_htg_node = LookUp(b,triplet(top_of_stacks(StackPtr)));
        // find or create
        dest->htg = current_htg_node;   // assign task graph node
        to basic block
    }
```

In this code, the DFO Driver can drive the traversal through the edges between blocks in the control flow graph. For each such edge that is taken, the Process function can perform a number of actions. First, the Process function can find the lowest common ancestor regions of regions that contain the source block and the destination block in the EH graph, loop graph, and SESE graph.

The Process function can also pop to the least common ancestor region in each of the three region graphs. This can include removing regions from the top of the three-region stack so that the top of the three-region stack includes the least common ancestor region from each of the three region graphs. As noted in the comment above, this can represent exiting regions in the traversal.

The Process function can also push to the three-region stack the regions on the ancestor path from the least common ancestor regions to the innermost regions containing the destination block. As noted in the comment above, this can represent entering regions in the traversal.

The Process function can also set the current HTG node equal to a hash lookup using the triplet formed by the references to regions in the top of the three-region stack. If no existing HTG node is found, a new HTG node can be generated.

Finally, the Process function can assign the found (existing or new) HTG node to the destination control flow graph block. This can include adding a pointer from the destination block to the corresponding HTG node.

The DFO driver can then drive the Process function to the next edge in the control flow graph, with the old destination block being the new source block in the function, and an unvisited block being the new destination block. In addition, the old destination block can be marked as having been visited, so that the DFO driver can avoid processing it multiple times.

11. Using Code to Form HTG Region Nodes in the Nested Loop Example

Referring now to FIGS. 14-19, an example of generating a hierarchical task graph using the flow graph (1210) and loop graph (1212) of FIG. 12 will be discussed. For the sake of simplification and clarity, this discussion will only consider the loop stack—omitting considerations of exception handling regions and single entry single exit regions. Accordingly, this example will, as a practical matter, map the loop graph onto a HTG.

In each of FIGS. 14-19, the actions of the Process function will be set forth in the box at the top of the figure. The basic blocks of the flow graph (1210) that have been visited will be indicated on the left, along with edges that have been taken in the traversal (i.e., not all edges in the flow graph (1210) will be shown, only those that have been taken in the traversal). In addition, the current HTG (1415) will be illustrated on the right, showing new nodes and links from the blocks of the flow graph (1210) in dashed lines and existing ones in solid lines. The visited basic blocks of the flow graph (1210) and the HTG are illustrated before (above) and after (below) the process actions.

Figure 14:
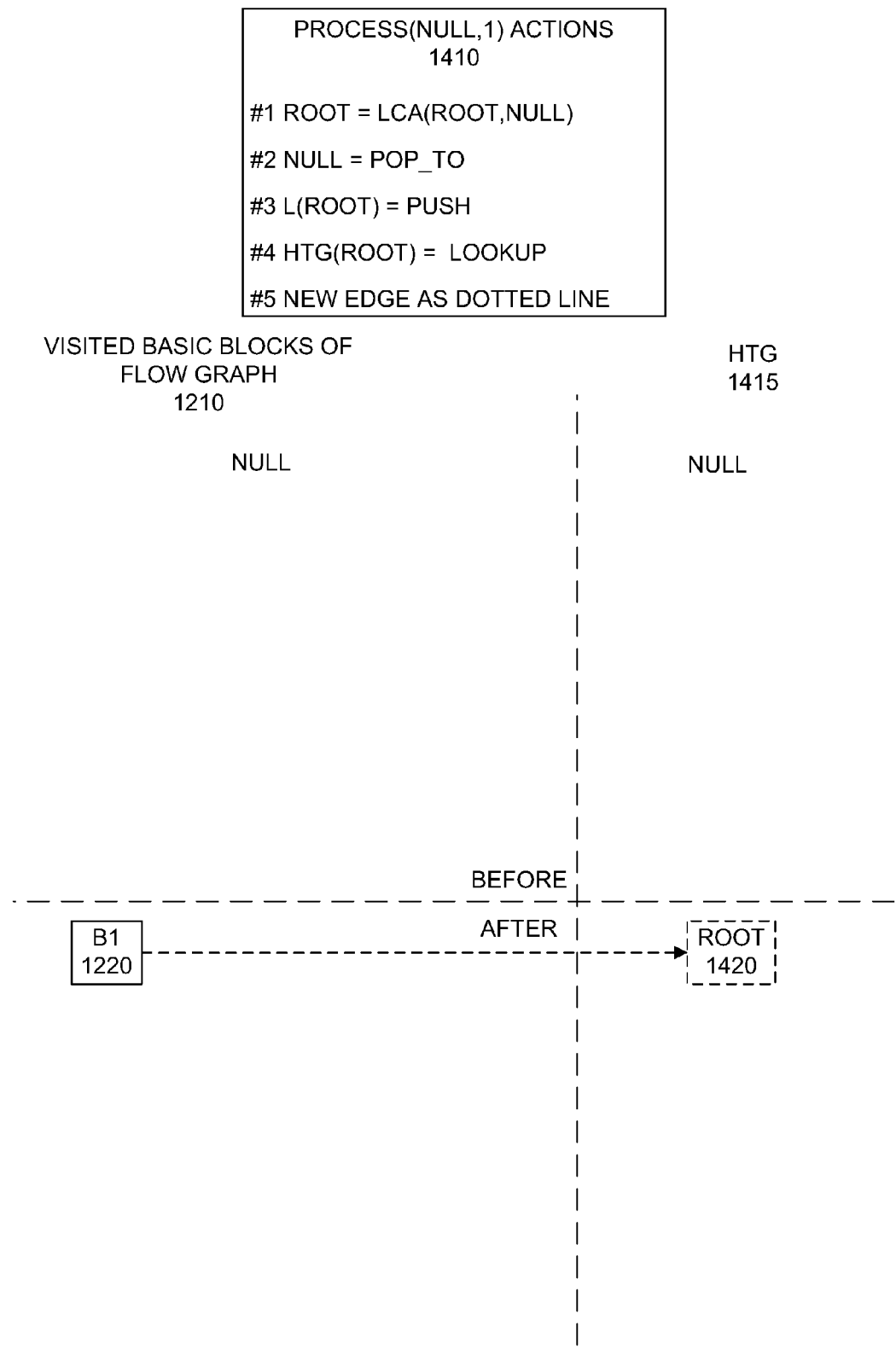
FIGS. 14-19 are block diagrams of process actions of a depth first ordered traversal of the flow graph of FIG. 12, as well as flow graph blocks visited during the traversal and a hierarchical task graph being generated during the traversal.

To begin, the DFO routine can traverse basic block 1 (1220), as illustrated in FIG. 14, and perform Process (Null,1) actions (1410). These actions (1410) can include finding the LCA of the root loop region (1250 in FIG. 12) and null, the LCA being the root loop region (1250 in FIG. 12). Of course, no regions are being exited, so there is no need to pop to any regions. However, as FIG. 12 illustrates, block 1 (1220) is in the root loop region (1250 in FIG. 12), so the actions (1410) can include pushing the root loop region onto the top of the three-region stack (not shown). The lookup will not find an HTG task region corresponding to the root loop region (1250 in FIG. 12), so the actions (1410) can include generating a root task region (1420) in the HTG (1415) corresponding to the root loop region (1250 in FIG. 12). In addition, a new edge can be generated from block 1 (1220) to the new root task region (1420).

Figure 15:
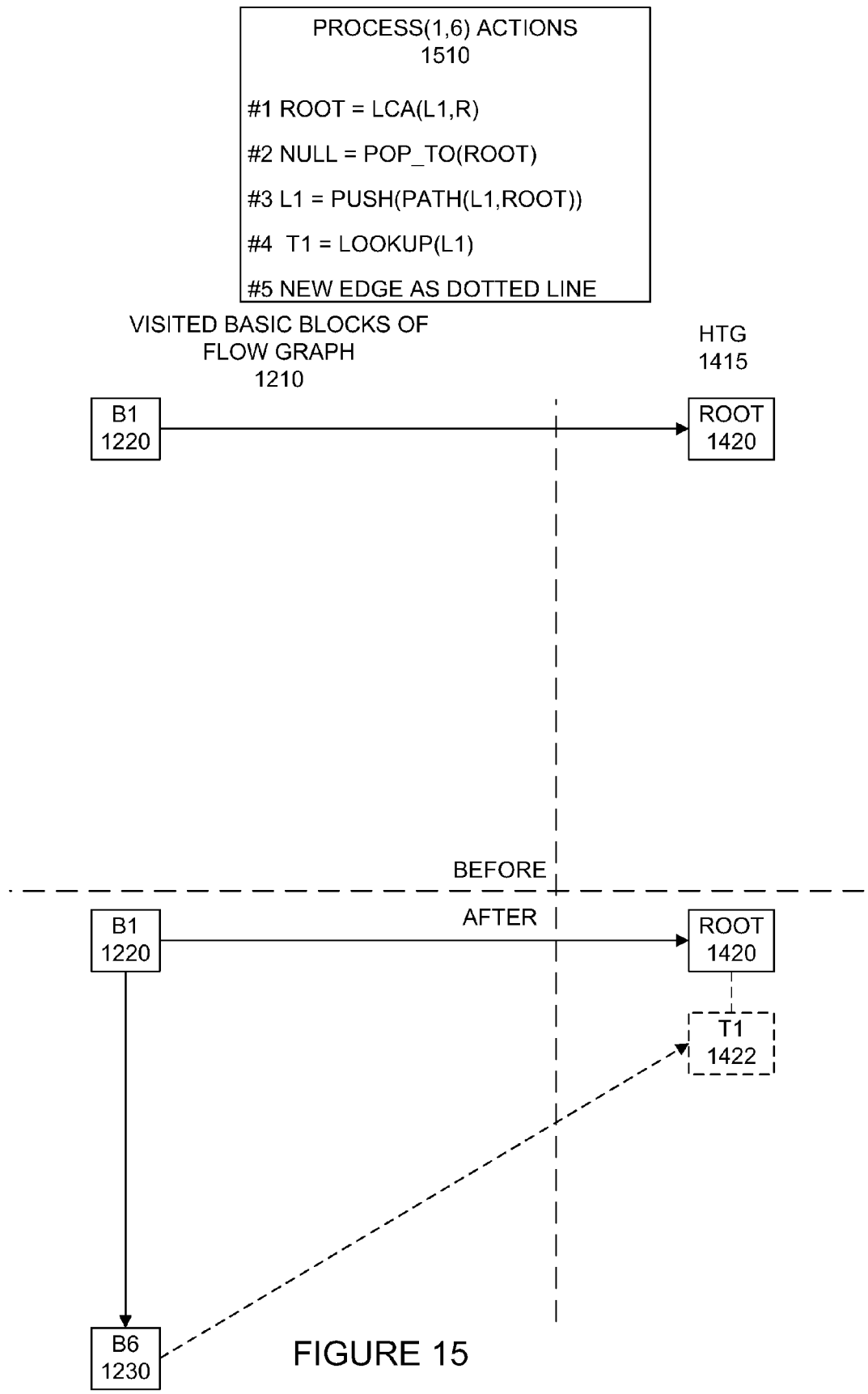

Referring to FIG. 15, the DFO routine can traverse from block 1 (1220) to block 6 (1230) and perform Process (1,6) actions (1510). These actions (1510) can include finding the LCA of the loop region L1 (1252 in FIG. 12) to which block 6 (1230) belongs, and the root loop region (1250 in FIG. 12), the LCA being the root loop region (1250 in FIG. 12). No regions are being exited, so there is no need to pop to any regions or remove any regions from the three-region stack. However, as FIG. 12 illustrates, block 6 is in the loop region L1 (1252 in FIG. 12), so the actions (1510) can include pushing the loop region L1 (1252 in FIG. 12) onto the top of the three-region stack (not shown). The lookup will not find an existing HTG task region corresponding to the loop region L1 (1252 in FIG. 12), so the actions (1510) can include generating a new HTG task region T1 (1422) corresponding to the loop region L1 (1252 in FIG. 12) below the root task region (1420). In addition, a new edge can be generated from block 6 (1230) to the new task region T1 (1422).

Figure 16:
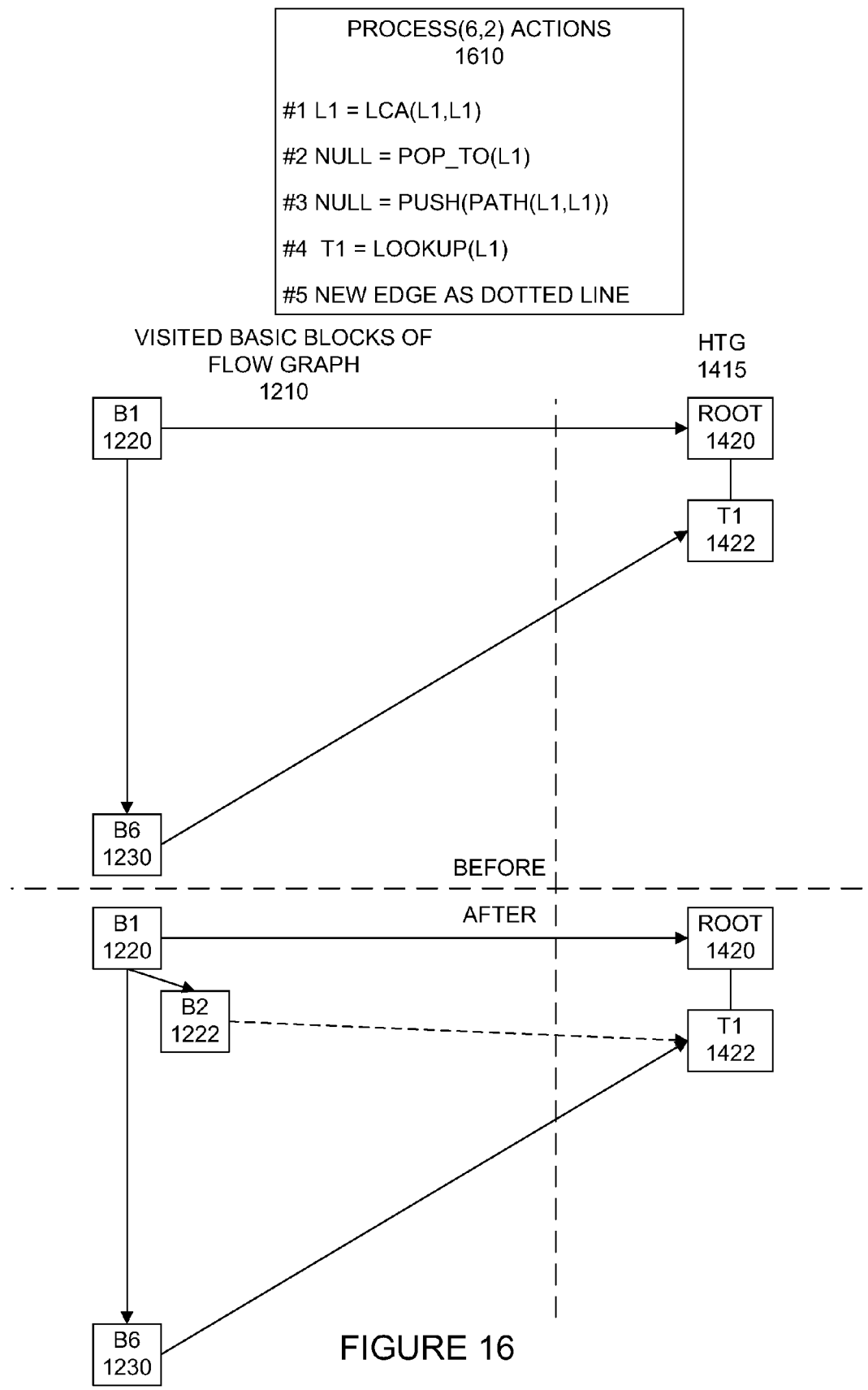

Referring now to FIG. 16, the DFO routine can traverse from block 6 (1230) to block 2 (1222) and perform Process (6,2) actions (1610). Note that the DFO routine could traverse the successors of block 6 (1230) before proceeding to block 2 (1222), those successors could be traversed after block 2 (1222) is traversed, or they could be traversed in some other order, but their traversal is not discussed in detail in this example. The actions (1610) can include finding the LCA of the loop region L1 (1252 in FIG. 12) to which block 6 (1230) belongs and that same loop region L1 (1252 in FIG. 12) to which block 2 (1222) belongs, the LCA being loop region L1 (1252 in FIG. 12). No regions are being exited, so there is no need to pop to any regions or remove any regions from the three-region stack. Additionally, no regions are being entered because the destination and source blocks are in the same region. The lookup will find existing HTG task region T1 (1422) corresponding to the loop region L1 (1252 in FIG. 12), so the actions (1610) do not need to generate a new HTG task region. A new edge can be generated from block 2 (1222) to the found task region T1 (1422).

Figure 17:
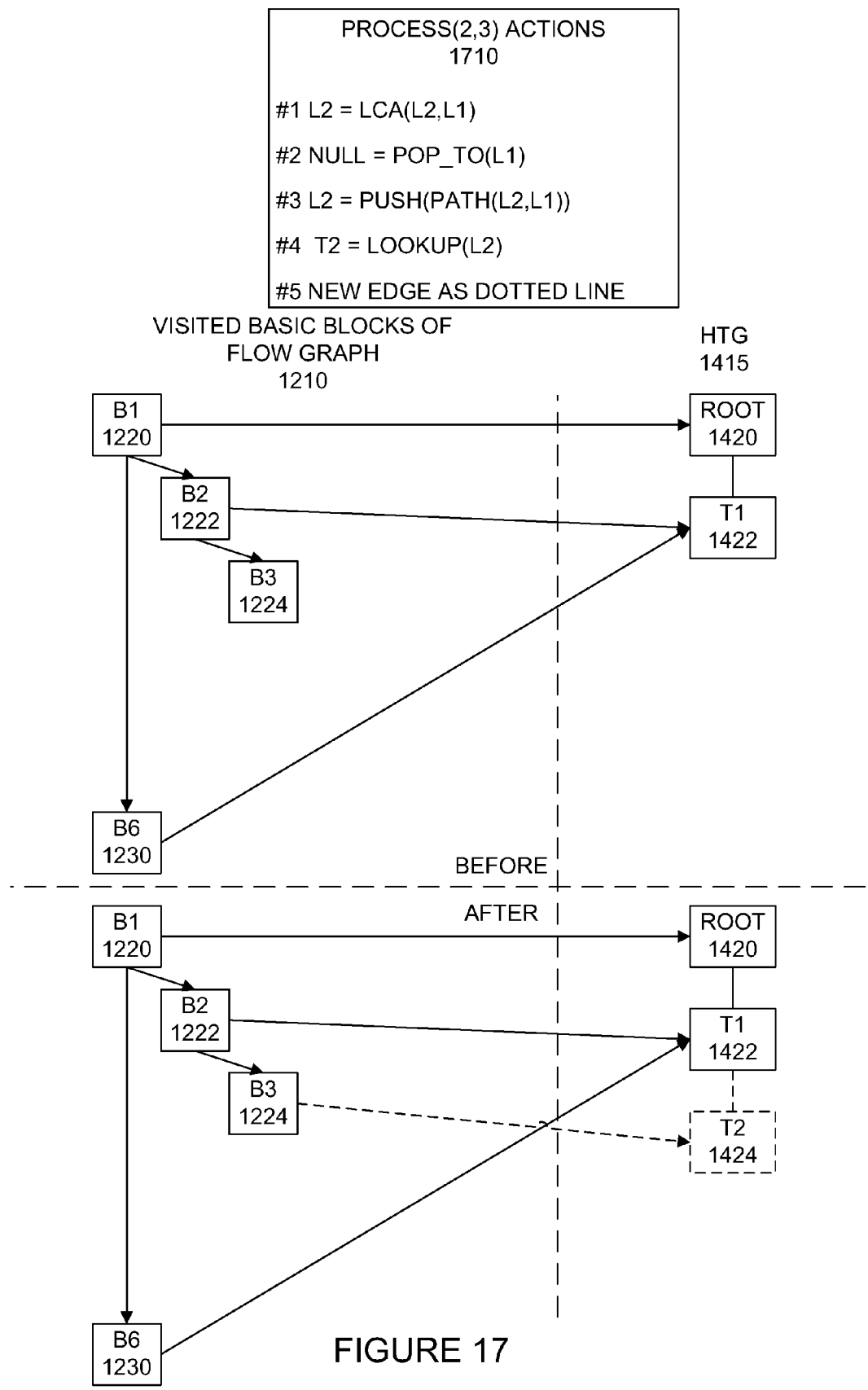

Referring to FIG. 17, the DFO routine can traverse from block 2 (1222) to block 3 (1224) and perform Process (2,3) actions (1710). These actions (1710) can include finding the LCA of the loop region L1 (1252 in FIG. 12) to which block 2 (1222) belongs, and the loop region L2 (1254 in FIG. 12) to which block 3 (1224) belongs, the LCA being loop region L2 (1254 in FIG. 12). No regions are being exited, so there is no need to pop to any regions or remove any regions from the three-region stack. However, as FIG. 12 illustrates, block 3 is in the loop region L2 (1254 in FIG. 12), so the actions (1710) can include pushing the loop region L2 (1254 in FIG. 12) onto the top of the three-region stack (not shown). The lookup will not find an existing HTG task region corresponding to the loop region L2 (1254 in FIG. 12), so the actions (1710) can include generating a new HTG task region T2 (1424) corresponding to the loop region L2 (1254 in FIG. 12) below the HTG task region T1 (1422). In addition, a new edge can be generated from block 3 (1224) to the new task region T2 (1424).

Figure 18:
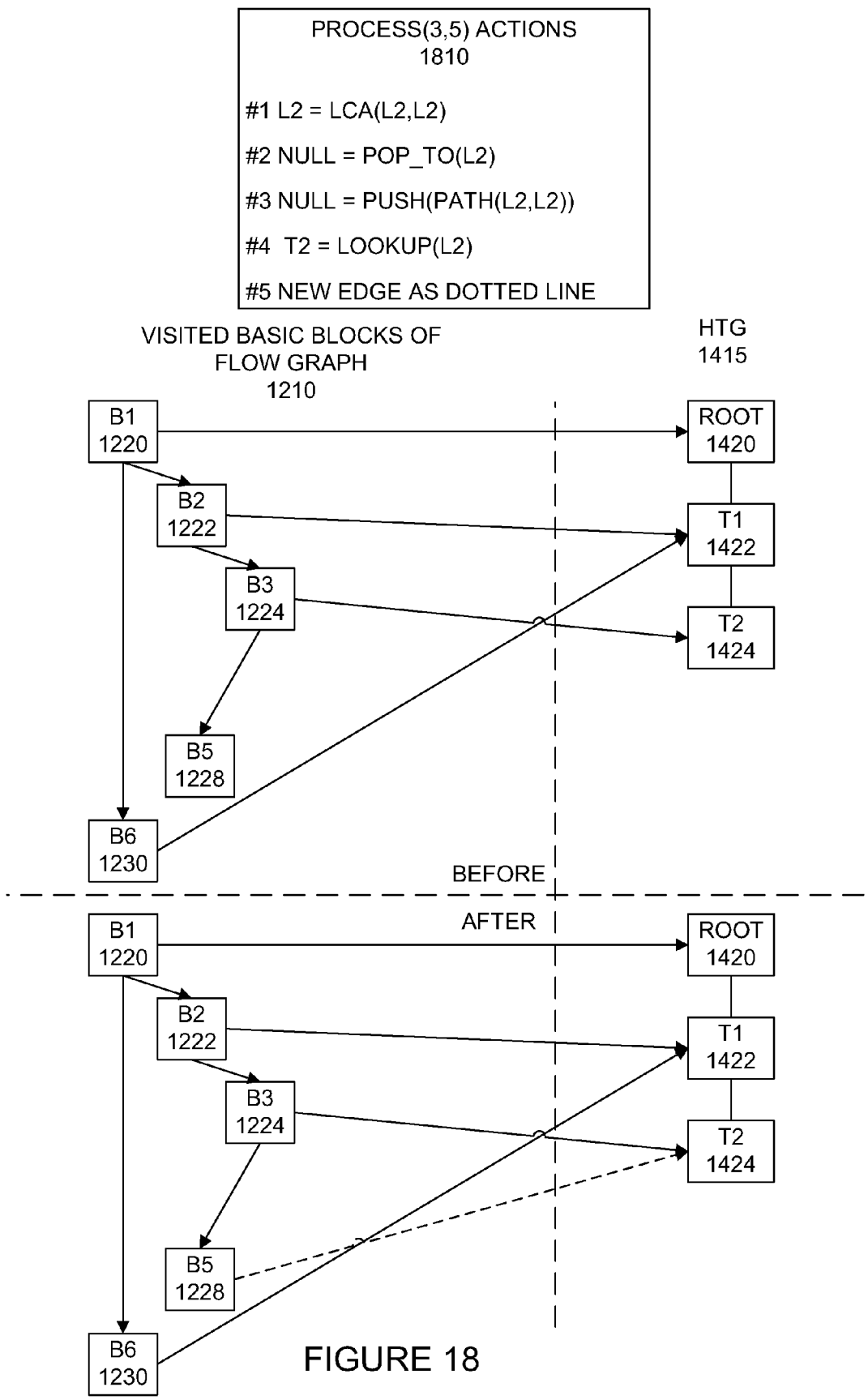

Referring now to FIG. 18, the DFO routine can traverse from block 3 (1224) to block 5 (1228) and perform Process (3,5) actions (1810). These actions (1810) can include finding the LCA of the loop region L2 (1254 in FIG. 12) to which block 3 (1224) belongs and that same loop region L2 (1254 in FIG. 12) to which block 5 (1228) belongs, the LCA being loop region L2 (1254 in FIG. 12). No regions are being exited, so there is no need to pop to any regions or remove any regions from the three-region stack. Additionally, no regions are being entered because the destination and source blocks are in the same region. The lookup will find existing HTG task region T2 (1424) corresponding to the loop region L2 (1254 in FIG. 12), so the actions (1810) do not need to generate a new HTG task region. A new edge can be generated from block 5 (1228) to the found task region T2 (1424).

Figure 19:
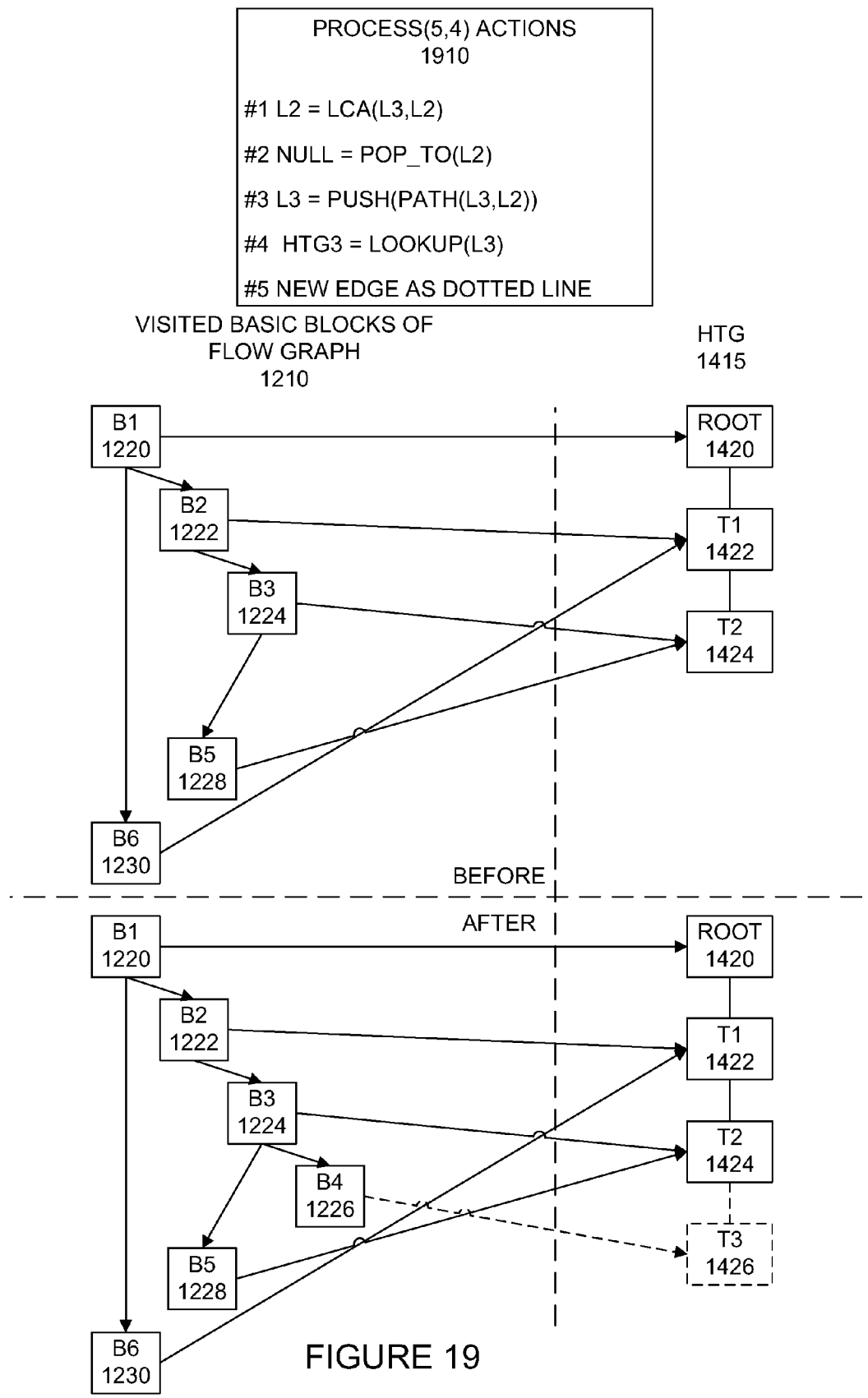

Referring to FIG. 19, the DFO routine can traverse from block 5 (1228) to block 4 (1226) and perform Process (5,4) actions (1910). These actions (1910) can include finding the LCA of the loop region L2 (1254 in FIG. 12) to which block 5 (1228) belongs, and the loop region L3 (1256 in FIG. 12) to which block 4 (1226) belongs, which is L2 (1254 in FIG. 12). No regions are being exited, so there is no need to pop to any regions or remove any regions from the three-region stack. However, as FIG. 12 illustrates, block 4 (1226) is in the loop region L3 (1256 in FIG. 12), so the actions (1910) can include pushing the loop region L3 (1256 in FIG. 12) onto the top of the three-region stack (not shown). The lookup will not find an existing HTG task region corresponding to the loop region L3 (1256 in FIG. 12), so the actions (1910) can include generating a new HTG task region T3 (1426) corresponding to the loop region L3 (1256 in FIG. 12) below the HTG task region T2 (1424). In addition, a new edge can be generated from block 4 (1226) to the new task region T3 (1426), thereby completing the HTG (1415).

12. Using Code to Track the Stack When Generating an HTG in the GOTO Example

Figure 20:
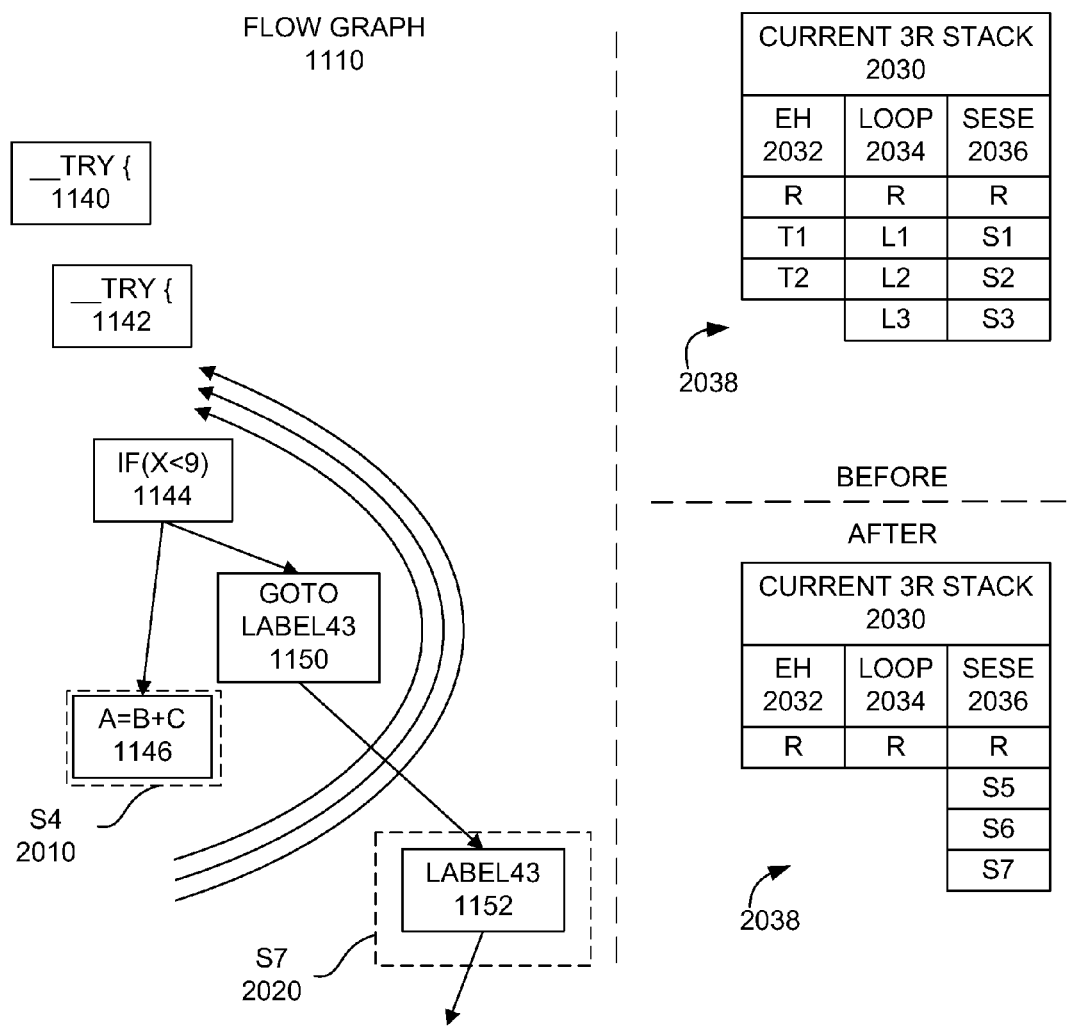
FIGS. 20-21 are block diagrams of process actions of a depth first ordered traversal of the flow graph of FIG. 11, as well as the flow graph of FIG. 11 with some task regions circumscribed with dashed lines, and a three-region state stack as it is modified during the traversal.
Figure 21:
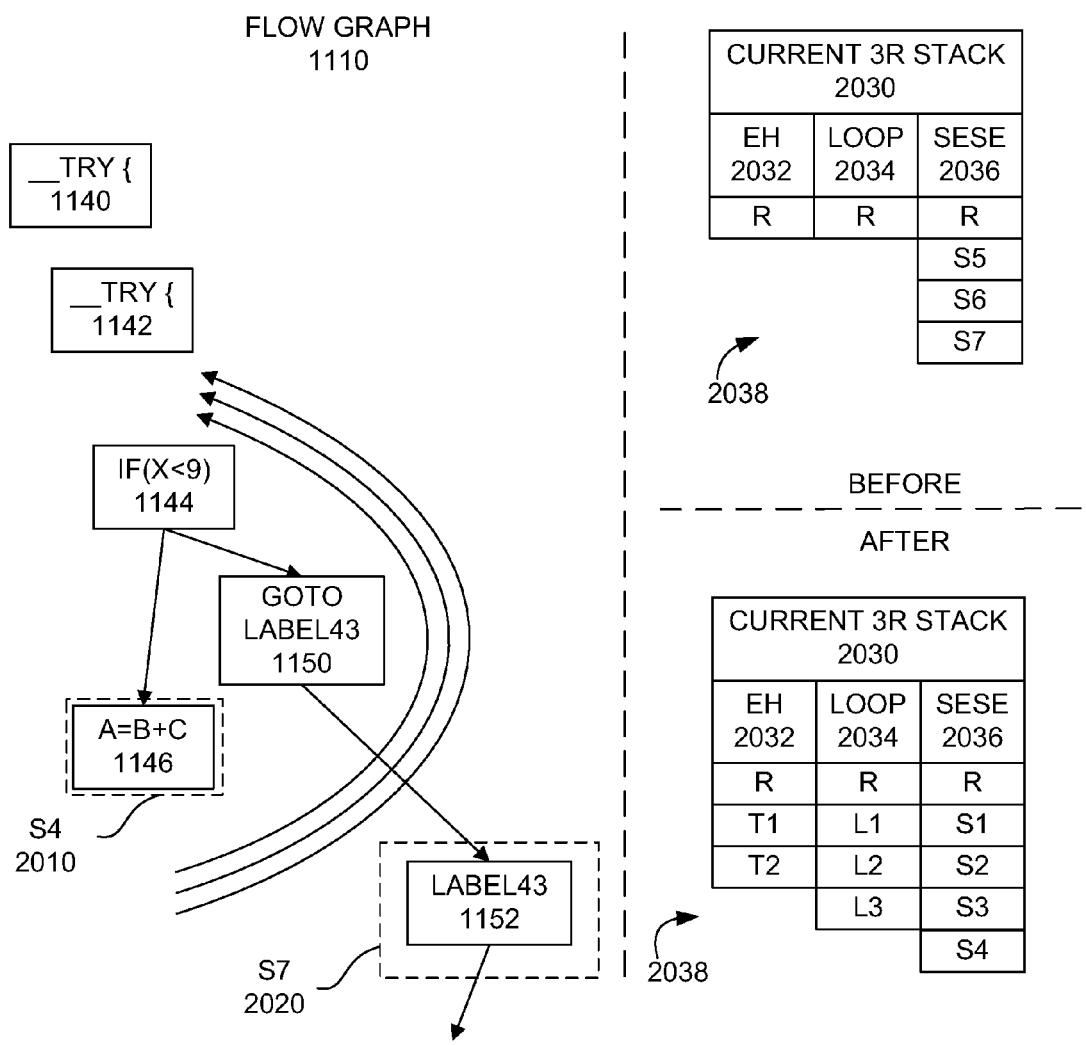

Referring now to FIGS. 20-21, the DFO routine for traversing between the GOTO block (1150) and the LABEL43 block (1152) in the flow graph (1110) of FIG. 11 will be discussed. In FIGS. 20-21, actions in the DFO routine will be set forth in a box at the top of each figure. The flow graph (1110) of FIG. 11 will be illustrated on the left side with block reference numbering corresponding to the block numbering in FIG. 11. Additionally, some pertinent regions are outlined in dashed lines, although not all regions are outlined in the flow graph (1110) of FIGS. 20-21 for the sake of brevity and focus. Particularly single entrance single exit region S4 (2010) can include the "a=b+c" basic block (1146), and single entrance single exit region S7 (2020) can include LABEL43 basic block (1152). As noted above with reference to FIG. 11, the flow graph itself is also not entirely complete because it is being used to focus on the DFO routine when traversing between particular blocks. At the right of each figure is a three-region stack (2030), including an exception handling region stack (2032), a loop region stack (2034), and a single entrance single exit region stack (2036). The top (2038) of the three-region stack (2030) forms a triplet that includes the top entry of each of the three stacks (2032, 2034, and 2036) that can be hashed to a task region of a HTG that is being generated with the DFO routine.

Referring now to FIG. 20, the top illustration of the three-region stack (2030) illustrates the stack (2030) when the DFO routine is at the GOTO block (1150) in the traversal of the flow graph (1110). The bottom illustration of the three-region stack (2030) illustrates the stack (2030) when the DFO routine is at the LABEL43 block (1152). The GOTO block (1150) is nested within nested exception handling regions T1 and T2, within nested loop regions L1, L2, and L3, and within nested single entry single exit regions S1, S2, and S3. The LABEL43 block (1152) is nested within single entrance single exit regions S5, S6, and S7, but is not nested within any exception handling or loop regions.

The text box at the top of FIG. 20 illustrates the Process( ) actions (2050) of the DFO routine when taking the edge from the GOTO block (1150) to the LABEL43 block (1152). These actions (2050) can include finding each of the following: the LCA of the destination root exception handling region R and the source exception handling region T2, which is the root region R; the LCA of the destination root loop region R and the source loop region L3, which is root region R; and the LCA of the destination single entry single exit region S7 and the source single entry single exit region S3, which is the root single entry single exit region R. The actions can include popping to the LCA regions, which are all the root regions, R, R, and R, thereby exiting regions T1, T2, L1, L2, L3, S1, S2, and S3, and removing those regions from the three-region stack (2030). In addition, the actions can include pushing regions S5, S6, and S7 onto the top of the single entrance single exit region stack (2036) of the three-region stack (2030), tracking the entry into those regions. This results in the three-region stack (2030) illustrated at the bottom right of FIG. 20, with a top (2038) having a triplet of R in the exception handling region stack (2032), R in the loop stack (2034), and S7 in the single entry single exit stack (2036). The lookup can return a new HTG task region (not shown) corresponding to exception handling region R, loop region R, and single entry single exit region S7. In addition, a new edge can be generated from the LABEL43 block (1152) to that new HTG task region.

Referring now to FIG. 21, the text box at the top of the figure illustrates the Process( ) actions (2150) of the DFO routine when taking the edge from the LABEL43 block (1152) as the source block back into the nested loops of the flow graph (1110). That recursion back to the "if (x<9)" basic block (1144) that is guarding the GOTO block (1150) can then proceed to the other successor of the "if (x<9)" block (1144), which is the "a=b+c" block (1146) (the new destination block). The actions (2150) can include finding each of the following: the LCA of the destination exception handling region T2 and the source root exception handling region R, which is the root region R; the LCA of the destination loop region L3 and the source root loop region R, which is root region R; and the LCA of the destination single entry single exit region S4 and the source single entry single exit region S7, which is the root single entry single exit region R. The actions can include popping to the LCA regions, which are all the root regions, R, R, and R, thereby exiting regions S5, S6, and S7, and removing those regions from the three-region stack (2030). In addition, the actions can include pushing regions T1 and T2 onto the top of the exception handling region stack (2032); pushing regions L1, L2, and L3 onto the top of the loop stack (2034); and pushing regions S1, S2, S3, and S4 onto the top of the single entrance single exit region stack (2036). This can result in the three-region stack (2030) illustrated at the bottom right of FIG. 21, with a top (2038) having a triplet of T2 in the exception handling region stack (2032), L3 in the loop stack (2034), and S4 in the single entrance single exit region stack (2036). The lookup can return a new HTG task region (not shown) corresponding to exception handling region T2, loop region L3, and single entry single exit region S4. In addition, a new edge can be generated from the "a=b+c" block (1146) to that new HTG task region.

Figure 22:
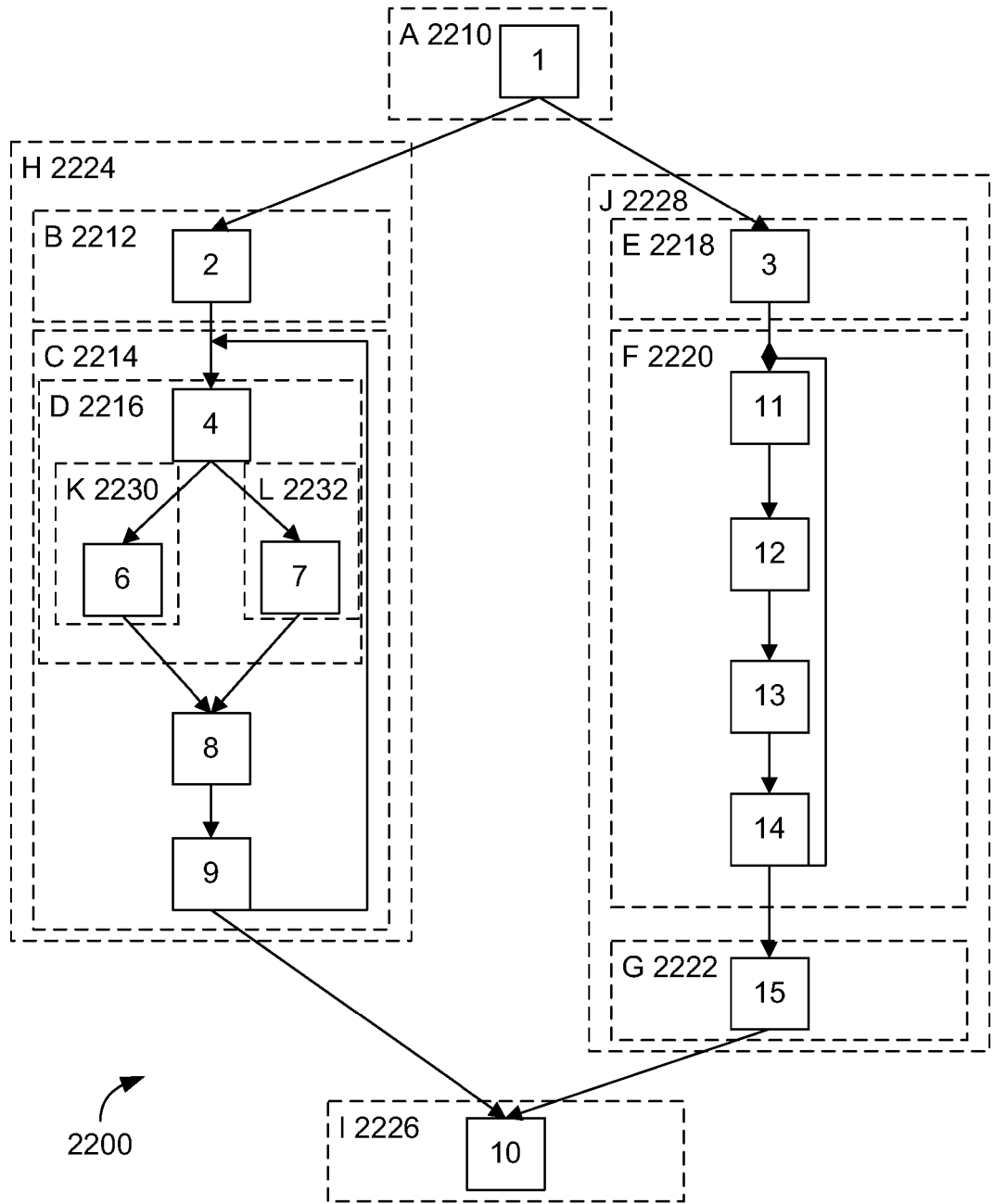
FIG. 22 is a block diagram of a control flow graph with corresponding task regions circumscribed with dashed lines.

Referring now to FIG. 22, an example of a flow graph (2200) is illustrated with basic blocks 1-15. In addition, dashed lines circumscribe the following task regions from a corresponding HTG: A (2210), a single entry single exit task region containing block 1; B (2212), a single entry single exit task region containing block 2; C (2214), a loop task region containing blocks 4, 6, 7, 8, and 9; D (2216), a single entry single exit task region containing blocks 4, 6, and 7; E (2218), a single entry single exit task region containing block 3; F (2220), a loop task region containing blocks 11, 12, 13, and 14; G (2222), a single entry single exit task region containing block 15; H (2224) a single entry single exit task region containing blocks 2, 4, 6, 7, 8, and 9; I (2226), a single entry single exit task region containing block 10; J (2228), a single entry single exit task region containing blocks 3, 11, 12, 13, 14, and 15; K (2230), a single entry single exit task region containing block 6; and L (2232), a single entry single exit task region containing block 7.

While generating a hierarchical task graph has been explained with reference to specific examples, it should be clear that this and other similar representations of source code can be generated for a wide variety of source code, even if that source code includes complex control configurations, loops, exception handling routines, and/or other types of source code configurations.

IV. Representing Dependencies

At runtime, each task region in the HTG can be scheduled to run when its control dependencies and data dependencies have been satisfied. Those task regions that have the same control dependencies and have no data dependencies between them can be scheduled to run in parallel as tasks. To model the control and data dependencies, two graphs (a control dependence (CD) graph and a data dependence (DD) graph) can be generated at the different levels in the HTG hierarchy.

To begin building the overall CD graph and DD graph, a CD graph and a DD graph can be built at the basic block level in the control flow graph to find regions with the same control dependencies. Because all statements within a basic block have the same control dependencies, it would be inefficient, although possible, to redundantly record control dependence edges between the program statements that are contained in each basic block. Also, for the DD graph, multiple edges that represent data dependencies between statements involving the same two basic blocks can be replaced with one edge.

With the minimal graphs having been created for the control flow graph, the graphs for each level of the HTG can be generated by applying the same pruning techniques as for the flow graph level. The CD graph and the DD graph from the previous level can be pruned so that all control dependence edges and all data dependence edges are the minimal set needed between the task nodes at the current level in the hierarchy. The CD graph and the DD graph can take various data structure forms, such as one or more tables that list dependencies for each task region.

Figure 23:
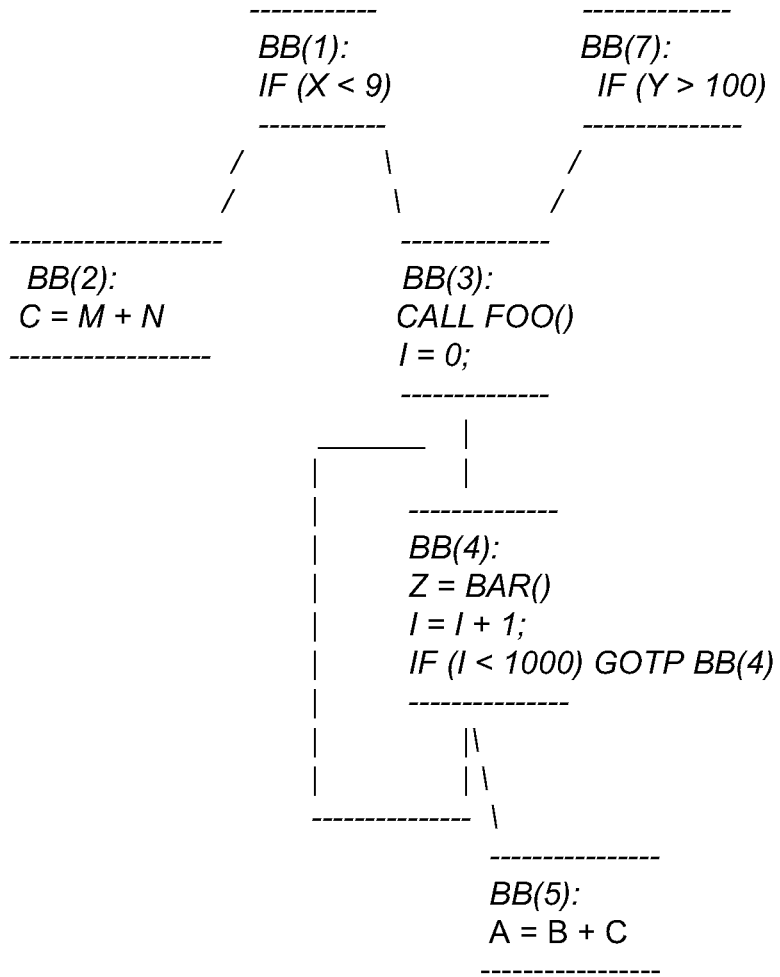
FIG. 23 is a control flow graph illustrating control dependencies between blocks.

Edges in the flow graph can be used to encode control dependencies. If execution of a statement depends on whether a test is true or false, then the associated edge in the flow graph can be used to encode that fact. Referring to an example illustrated in FIG. 23, the control dependencies for BB(3) (basic block 3) can be represented as the union of two scenarios: (1) the edge from BB(7) to BB(3) is taken, or (2) the edge from BB(1) to BB(3) is taken. In other words, CD(BB (3))=((7–3)V(1–3)).

Figure 24:
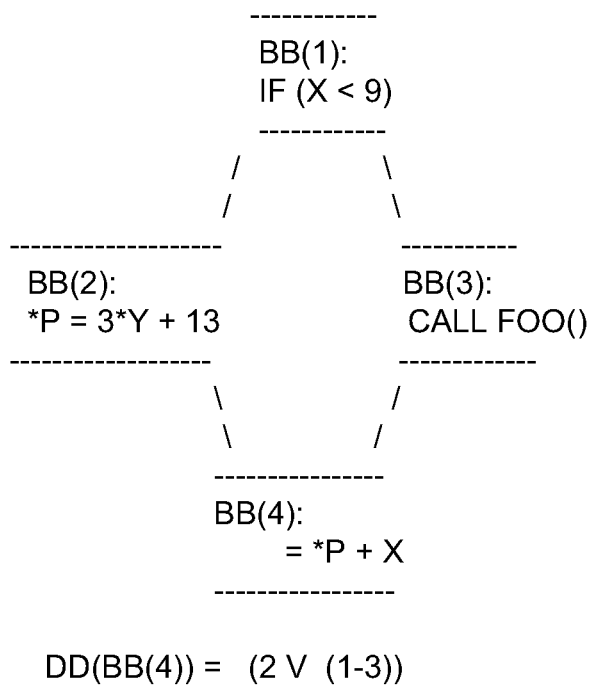
FIG. 24 is a control flow graph illustrating data dependencies between blocks.

The nodes and edges of the flow graph can also be used to encode data dependencies. A data dependency can be encoded as being satisfied if execution of the flow graph block containing the source of the data dependency is completed, or an edge in the flow graph is taken which will guarantee that the block containing the source of the data dependency will never be reached. Referring to the example in FIG. 24, the control dependency of BB(4) (basic block 4) on BB(2) can be represented as the union of two scenarios: (1) BB(2) is completed, or (2) the edge from BB(1) to BB(3) is taken so that BB(2) will not be reached. In other words, DD(BB(4))=(2V (1–3)). Coding dependencies will be discussed more below.

V. Generating Self Scheduling Code

Once the HTG, which can be an acyclic graph, is generated, a compiler can walk the HTG in a depth first order. During this walk of the HTG, an optimizer can perform parallel (and/or) vector code generation transformations in each region using the minimal set of control and data dependencies that are needed for correct code generation. These transformations are described below.

A. Using Lambda Expressions to Schedule Code Execution

Lambda expressions can define and construct unnamed function objects, which can behave like handwritten function objects. Lambda expressions can be used to schedule code execution, such as to schedule the execution of blocks of code in parallel. C++ lambda expressions are available in Microsoft's Visual Studio® Dev10 development system. Other lambda expressions could also be used, such as lambda expressions in Visual Basic 9.0 and C#3.0 programming languages.

Table 11 below provides an example of a simple C++ lambda expression using syntax from Microsoft's Visual Studio® Dev10 development system. This expression is similar to creating a structure and overloading the "( )" operator, or redefining the "( )" as what is included in the "{ }" expression. The expression in Table 11 will return the value of x+y. In this expression, the "[ ]" is part of the syntax of the lambda expression, and is used to define how arguments are passed into the lambda expression. The default is to pass arguments in by value, so that copies of the local variables are stored within the function object. This can allow the lambda function to be used after the end of the lifetime of the original variables that were passed to the lambda function. Arguments can also be passed by reference by using an "&" within the brackets: "[&]". The default of passing arguments by value can also be explicitly specified by using "[=]" instead of "[&]".

TABLE 11

[ ] (int x, int y) { return x + y; }

Following is a C++ example for performing the same function (adding x+y) using another lambda expression syntax.

TABLE 12

```
struct LambdaFunctor {
    int operator ( ) (int x, int y) { return x + y; }    // definition
}
void foo(int a, int b) {
    return LambdaFunctor(a,b);    // use
}
```

The defaults for specifying how variables are passed into a lambda expression can also be combined with lists of variables. For example, if the user wants to capture most variables by reference, but have one by value, then the user can do the following, where "value" is passed by value and "total" is passed by reference:

TABLE 13

```
int total = 0;
int value = 5;
[&, value] (int x) { total += (x * value) };
```

Lambda expressions can be used in making calls to Microsoft's parallel patterns library (PPL) to form self-scheduling parallel code that schedules task regions to be executed in parallel as tasks.

Following is an example of using a C++ lambda expression and PPL calls to create a parallel (recursive) quicksort. The bodies of the lambda expressions are passed as a function pointer to the g.run( ) calls, which can be scheduled by an operating system to execute in parallel.

TABLE 14

```
void quicksort(int *a, int * temp, int n) {
    if(n < serial_threshold) {
        serial_sort(a,n); return
    }
    // note: not std::partition
    int mid = partition(a[0], a, temp, n);
    task_group g;
    g.run([&]{quicksort(a, temp, mid);});
    g.run([&]{quicksort(a+mid, temp+mid, n-mid);});
    g.wait( );
}
```

The use of lambda expressions in C++ schedule code to run in parallel is just one example of an implementation. Other programming languages can have different ways of scheduling code to run in parallel. Moreover, self-scheduling parallel binary machine code can be generated from the same representations of the source code that are discussed above (such as the HTG and dependency representations). Parallel code can also be generated using different abstractions. For example, machine code can use outlining, and can generate Open MP binary constructs that exist in existing UTC compilers.

B. Reading Lambda Expressions for User-Specified Threads

A compiler can recognize lambda functions that the user has specified, and can add these directly to the HTG by building a lambda graph that forms a DAG. This lambda graph can be generated and used in the same manner as the EH graph, loop graph, and SESE graph discussed above.

In one implementation, the UTC compiler Dev10 implementation can exploit a language defined property of lambda expression in order to recognize them in the UTC tuple stream (i.e., the compiler's intermediate representation that is passed from the front end to the back end). Lambda expressions can be function objects of a compiler-dependent type; this type's name can be available only to the compiler. Thus, the compiler back end can look at its records and peer into the name that the front end gave the symbol and know whether the function being called is a lambda expression.

Consider the following example from a C++ front end dump: "public: int_thiscall 'anonymous namespace'::<lambda0>::operator( ) (class A &&)const". For this source level construct, the back end can see the following: "??R<lambda0>@?A0x3f45b300@@QBEH$$EAVA@@@Z". The "??R<lambda0>" string is not something a user creates. Thus, the backend project can proceed with an ugly strcmp( ) on the symbol name to determine whether the symbol corresponds to a lambda expression, without modifying the compiler front end or the UTC reader.

C. Pulling Threads from Regions Contained in Exception Handling

Once the HTG is generated, parallelism may be able to be extracted in the presence of exception handling by duplicating the exception handling within each resulting thread. The data structures described above can allow the identification of exception handling routines and code within those routines. This can allow a transformation by duplicating the exception handling within each thread that corresponds to a body of code within the exception handling routine. This can work under the assumption that the parallel runtime will guarantee that the application can catch the first exception thrown from some thread, though not in any defined order. Table 15 below includes an example of such a transformation, with the code before the transformation on the top and the code after the transformation on the bottom.

TABLE 15

```
Before Transformation:
    _try
    {
        for (i = 1; i < 10000; i ++) {
            Body_1
        }
        for (j = 1; j < 10000; j++) {
            Body_2
        }
    }
    _except(GetExceptionCode( ))
    {
        exception handler code
        with limited side effects
    }
```

TABLE 15-continued

```
After Transformation:
g.run( [&] {
  __try
  {
    for (i = 1; i < 10000; i++) {    // Loop 1
      Body_1
    }
  }
  __except(GetExceptionCode( ))
  {
  } } )
g.run( [&] {
  __try
  {
    for (j = 1; j < 10000; j++) {    // Loop 2
      Body_2
    }
  }
  __except(GetExceptionCode( ))
  {
  } } )
```

D. Automatically Writing Parallel Source Code

Each task region in each level of the HTG can be potentially turned into a C++ lambda expression that can subsequently be passed to a PPL call that schedules the task regions. Following is a discussion of determining the arguments and placement of these self scheduling task regions in modified parallel C++ code that represents the existing code. Of course, other programming languages could be used instead of C++.

1. Code Generation for Dependencies in General

As discussed above, each task region in the HTG is dependent on a set of control dependencies (CD) and data dependencies (DD) that have been encoded in a table or graph, as discussed above. Each task region in the HTG can map to a task that can be wrapped in a C++ lambda expression and scheduled as a lightweight thread (such as a WIN 7 UMT or Dev10 PPL library call).

The dependencies can be encoded to ensure that each lambda expression can execute once all pre-requisite dependencies have been fulfilled by emitting code at the end of every basic block that fulfills a data dependency or a control dependency for another block. Thus, this code can be generated to implement the data and control dependencies. Accordingly, the code that enables a task region in the HTG to execute as a task can be distributed to the blocks that determine when a lambda expression can be scheduled for execution of that task.

Each lambda expression can be scheduled to run a corresponding set of one or more task regions as one or more tasks when the union of the task region's or regions' control dependencies and data dependencies are fulfilled at runtime. The execution conditions of a task region number N is the union of its control dependencies and its data dependencies: Exec(N)= CD(N) U DD(N). The code for Exec(N) can be distributed throughout the HTG so that the last node that determines Exec(N) can then schedule region N. Region N can be wrapped in a lambda expression, as discussed herein, and passed to a PPL library call.

Figure 25:
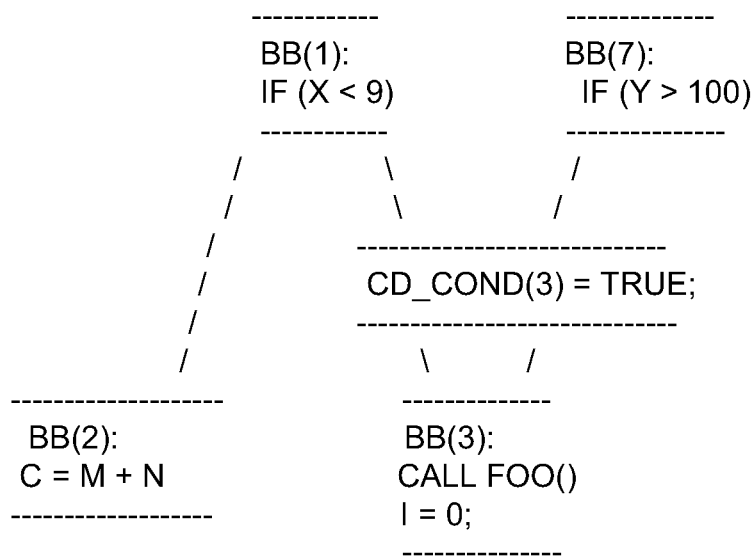
FIG. 25 is a control flow graph with a control dependency coded in the graph.

To implement the code for Exec(N), local Boolean variables can be introduced to track whether control dependencies have been satisfied, and local integer variables can be introduced to track whether data dependencies have been satisfied. Referring now to FIG. 25, a local variable CD_COND(3) can be introduced, and can be set to true along the edge from BB(1) to BB(3) and the edge from BB(7) to BB(3), so that CD_COND(3)=TRUE if either of those edges is taken. When CD_COND(3)=true, that indicates that the control dependencies for BB(3) are satisfied.

Figure 26:
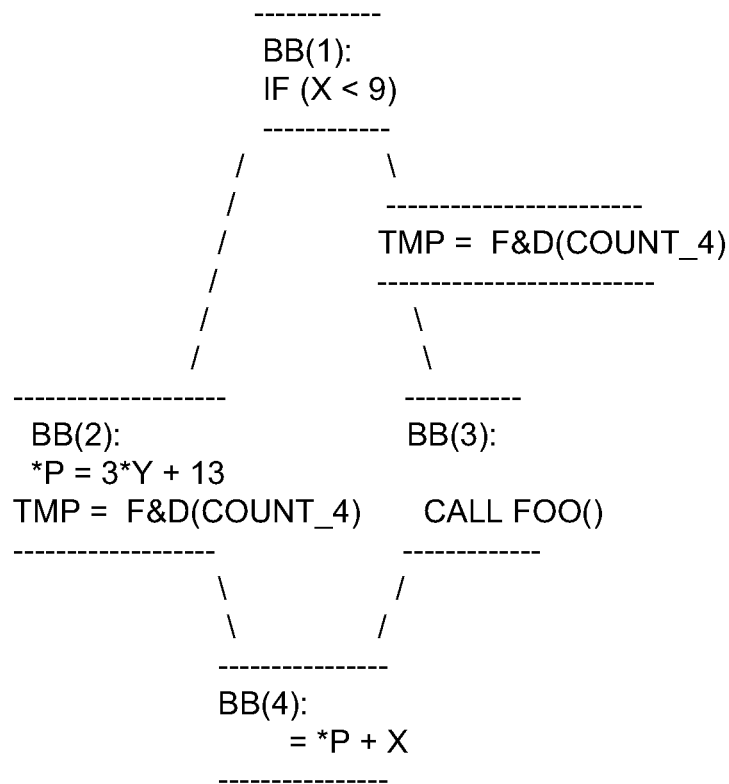
FIG. 26 is a control flow graph with a data dependency coded in the graph.

Referring to FIG. 26, a local variable COUNT_4 can be introduced and set to a number equal to the number of data dependencies for BB(4). An atomic fetch and decrement operation F&D( ) can be introduced at each point where a data dependency is satisfied to keep a count of the data dependencies for a node and to decrement that count as the dependences are satisfied at runtime, one-by-one. In the example of FIG. 26, the COUNT_4 variable can be decremented by one if the program executes BB(2) to satisfy the data dependency on BB(2) for the variable *P, or if the edge from BB(1) to BB(3) is taken, indicating that BB(2) will not run so that there is no need to wait for the data dependency to be satisfied.

Once the control and data dependencies for a region have been satisfied, then that region can be scheduled for execution. Using the table of conditions (i.e., dependencies between regions) for each node in the HTG, code can be emitted for control dependencies and data dependencies, as well as other optimizing code such as for privatization, as set forth below.

2. Code for Control Dependencies

As has been discussed above, control dependencies for a region can be encoded as the logical OR of all the edges that could be taken to ensure execution of the region N. The label of an edge between BB(x) and BB(y) can be encoded as edge (x–y). That can lead to the following encoding of control dependence in the table of control dependencies: CD(N)= (X1–Y1)V(X2–Y2) . . . V(Xn–Yn). This can lead to the following code generation at the end of every block of the control flow graph that ends a task region that determines control dependencies for region N Xi from X1 . . . Xn as follows:

TABLE 16

```
if (Xi – Yi) {
  if (DD_COUNT(N) = 0)
    g.run( [ ] (int a, int b) { code for region N });   // C++ lambda
                                                        and PPL construct
  else
    CD_COND(N) = True;
}
```

In this code, "DD_COUNT(N)" is an atomic primitive that returns the current count of data dependencies that are outstanding for region N. The "CD_COND(N)" call is an atomic primitive that returns whether the control dependencies for region N have been fulfilled. As can be seen, by taking Xi–Yi, the control dependencies for N are satisfied. Accordingly, if the data dependencies are satisfied, then the code executes the lambda expression to run the region. If the data dependencies are not satisfied, then the code sets CD_COND(N) to True, so that the region can be run when the data dependencies are satisfied.

3. Code for Data Dependencies

Data dependencies can be encoded in the dependency table as a series of either actual data dependencies, or edges that avoid the execution of the block which is the source of the dependence. A data dependency where the source of the edge depends on the execution of a block BB(Y) is encoded in the table as either BB(Y) or an edge from BB(C) to BB(D) such that BB(Y) is never executed. This can be encoded as the following conjunction: (Y V(C–D)). Thus, the complete set of data dependencies for region N can be encoded as the following in the table: DD(N)=((Y1 V(C1–D1) . . . ) and (Y2

V(C2–D2) . . . ) . . . and (Yn V(Cn–Dn) . . . )). This can lead to generating code at the end of 2 scenarios for each data dependence:

First, in Scenario 1, the data dependency can execute (not avoided due to runtime control flow). This can lead to the following code generation at the end of every block Yi from Y1 . . . Yn of the control flow graph that ends a task region where the source of a data dependency for region N exists as follows:

TABLE 17

```
Temp_N = F&D(DD_COUNT(N))
If (CD_COND(N) = True && Temp_N=1) {
    g.run( [ ] (int a, int b) { code for region N });    // C++ lambda
    and PPL construct
}
```

As can be seen, in this code at the end of each block that satisfies a data dependency for N, the data dependency counter for N, DD_COUNT(N), is decremented. If that decrement results in all the data dependencies having been satisfied, and if the control dependencies have been satisfied (CD_COND(N)=True), then the code can execute the lambda expression to run the region. If not, then the code does not yet execute the lambda expression.

Second, in Scenario 2, an edge is taken that assures that the data dependency will never execute. This can lead to the following code generation at the end of every block Ci from C1 . . . Cn of the control flow graph that ends a task region where an edge is taken so that the corresponding data dependency source Yi will not be executed.

TABLE 18

```
if (Ci – Di) {
    Temp_N = F&D(DD_COUNT(N)
    if (CD_COND(N) == True && Temp_N == 1) {
        g.run( [ ] (int a, int b) { code for region N });    // C++ lambda
        and PPL construct
    }
}
```

As can be seen, in this code at the end of each block where an edge is taken that assures that a source of a data dependency for N will not be run, the data dependency counter for N, DD_COUNT(N), is decremented. If that decrement results in all the data dependencies having been satisfied, and if the control dependencies have been satisfied (CD_COND(N)=True), then the code can execute the lambda expression to run the region. If not, then the code does not execute the lambda expression.

In addition, if it is determined that two regions can be initiated in parallel, then when the data and control dependencies for the two regions are satisfied, the code to run the regions in parallel can be executed, such as by including adjacent g.run statements for the two regions, as is illustrated above in Table 14. In addition, wrapping regions in separate g.run statements, as discussed above, can allow different regions to be run in different threads that can execute during partially or completely overlapping time periods (i.e., the regions can run in parallel). Following is an example of code where two loop regions, Region 1 and Region 2, from a fast Fourier transform (FFT) routine can be wrapped in a lambda expression and run in parallel.

TABLE 19

```
void fourn(float data[ ], unsigned long nn[ ], int ndim, int isign)
{
    int idim;
    unsigned long i1,i2,i3,i2rev,i3rev,ip1,ip2,ip3,ifp1,ifp2;
    unsigned long ibit,k1,k2,n,nprev,nrem,ntot;
    float tempi,tempr;
    double theta,wi,wpi,wpr,wr,wtemp;
    for (ntot=1,idim=1;idim<=ndim;idim++)
        ntot *= nn[idim];
    nprev=1;
    for (idim=ndim;idim>=1;idim--) {
        n=nn[idim];
        nrem=ntot/(n*nprev);
        ip1=nprev << 1;
        ip2=ip1*n;
        ip3=ip2*nrem;
        i2rev=1;
        for (i2=1;i2<=ip2;i2+=ip1) {
            // Beginning of Parallel Region 1
            ip2_private = ip2
            i2rev_private = i2rev;
            if (i2 < i2rev_private) {
                for (i1=i2;i1<=i2+ip1–2;i1+=2) {
                    for (i3=i1;i3<=ip3;i3+=ip2_priv) {
                        i3rev=i2rev_private+i3–i2_rev_private;
                        SWAP(data[i3],data[i3rev]);
                        SWAP(data[i3+1],data[i3rev+1]);
                    }
                }
            }
            // End of Parallel Region 1 and Beginning of Parallel Region 2
            ibit=ip2 >> 1;
            while (ibit >= ip1 && i2rev > ibit) {
                i2rev –= ibit;
                ibit >>= 1;
            }
            i2rev += ibit;
            // End of Parallel Region 2
        }
        ifp1=ip1;
        while (ifp1 < ip2) {
            ifp2=ifp1 << 1;
< ... SNIPPED OUT THE REST OF THIS OUTER LOOP FOR SIMPLICITY...>
```

4. Code for Privatization

Lambda expressions can be used to provide an elegant way of expressing the results of "privatization". Privatization is an optimization that can be performed to break dependencies that force regions of a program to run sequentially, rather than in parallel.

Consider the following example of privatizing a variable Y, which had been thwarting parallelism. COBEGIN and COEND indicate a standard internal compiler pseudo operation that indicates a parallel region between the two indicators. In the parallel region, it is permissible to execute any legal parallelism. However, referring to the first row in the table below, there is an anti-dependence that forces the write of Y in "y=a+b" and the subsequent statements "t=y" and "q=y/a+c" that use the new value of Y to wait until the last read of the old value of Y in "x=y+2" is completed. This anti-dependence thwarts the running of the first two statements in parallel with the last three statements.

As is shown in the second row of the table below, Y can be privatized by substituting a "private" variable "private_y" for the variable Y in the last three statements. This privatization breaks the anti-dependence on Y, allowing the first two statements to be run in parallel with the last three statements because there are two independent lifetimes for Y when there had been only one.

As is shown in the third row of the table below, the privatization of Y can be done using a lambda expression. As discussed above, there are different ways of passing values into lambda expressions. The values can be passed, by-reference, by-value, or as explicit arguments to the lambda. The "[=]" syntax in the lambda expressions in the third row of the table below means that Y is copied (passed by value) into the lambda expression. That means that Y is effectively renamed by the argument passing style in this lambda, or in other words that Y is privatized by the lambda expressions. Variables Z and Q are passed into the lambda expressions by reference, so those variables are updated in the lambda, and the updated values can be used later by the program that includes this code. In other words, variables Z and Q are live out of the lambda expressions, so they are passed into the lambda expressions by reference, expecting a side effect.

TABLE 20

```
COBEGIN
x = y + 2;
z = x * 3;
y = a + b;
t = y;
q = y /a + c;
COEND
COBEGIN
x = y + 2;
z = x * 3;
// The code below this point could be run in parallel with the code
// above this point because privatization has broken the
anti-dependence on y.
    private_y = a + b;
    t = private_y;
    q = private_y /a + c;
COEND
int x,y,z,t,v,a,b,c;
...
g.run( [=,z] ( ) { x = y + 2;
                    z = x * 3} );
g.run( [=,q] ( ) { y = a + b;
                    t = y;
                    q = y /a + c} );
g.wait( );
```

Besides privatization, the compiler can perform other optimizations, such as optimizations that allow for additional parallelism or optimizations that prevent parallelism when such parallelism would not be efficient (e.g., where the regions that could be run in parallel are small enough that it is not worth the additional overhead to run them in parallel). Such optimizations can be done according to standard techniques that are currently done when manually writing parallel code.

The code described above for control dependencies, data dependencies, and for privatization can be inserted in intermediate compiler format, or IR (intermediate representation) into the intermediate representation of the existing source code to form a modified parallel intermediate compiler format representation of the existing source code. This modified parallel intermediate representation of the existing source code can be traversed to emit parallel source code and/or parallel executable binary machine code.

VI. Parallel Code Representation Generation Techniques

Several parallel code representation generation techniques will now be described with reference to FIGS. 27-29. Some or all of each technique can be performed automatically, such as by a compiler in a source code compiler environment, as discussed above, or in some other computing environment.

Figure 27:
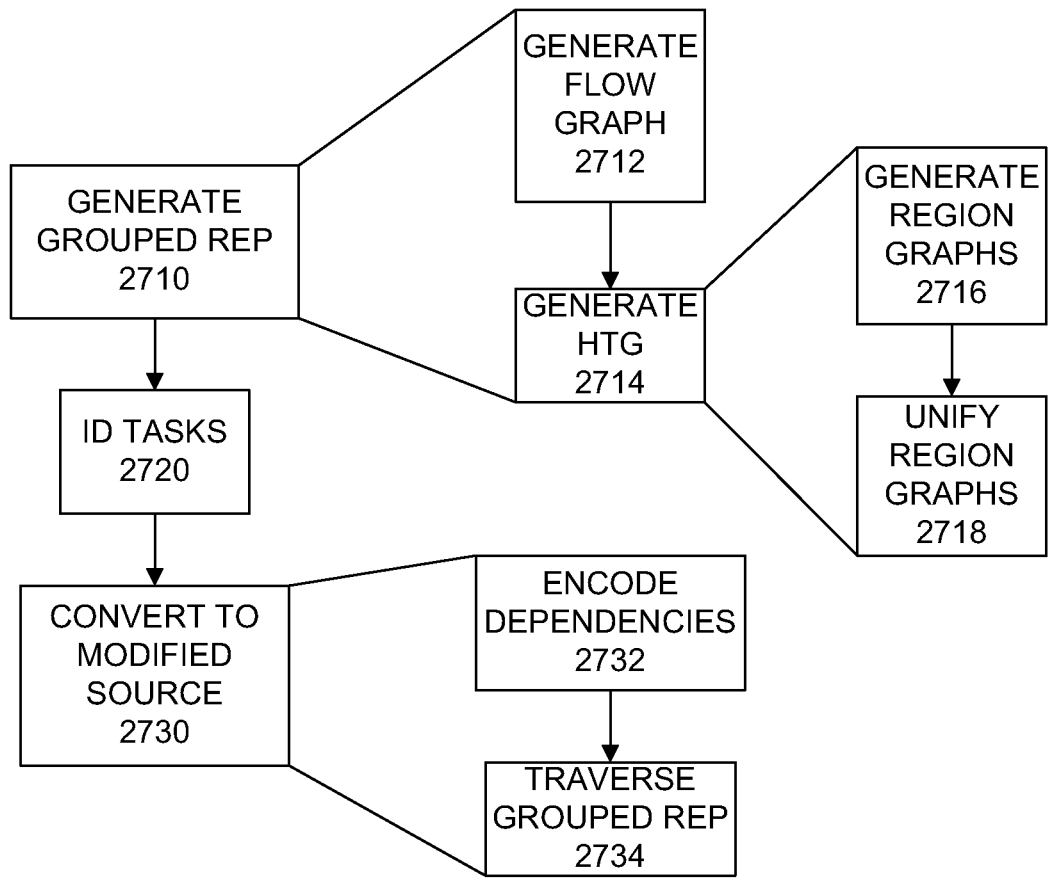
FIG. 27 is a flow diagram of a technique for producing modified parallel source code from existing source code.

Referring to FIG. 27, a technique for producing parallel source code from existing source code is illustrated. In the technique, a grouped representation of the existing source code can be generated (2710), where the grouped representation includes regions of the existing source code. For example, this generation (2710) can include generating (2712) a control flow graph representing the existing source code, and generating (2714) a hierarchical task graph from the flow graph. Generating (2714) the hierarchical task graph can include generating (2716) region graphs that group blocks from the control flow graph into regions. The region graphs can include, for example, a single entry single exit region graph, a loop region graph, an exception handling region graph, and even a user-defined region graph (such as where user-defined regions are created from lambda expressions in the existing source code). Generating (2714) the hierarchical task graph can also include unifying (2718) the region graphs into the hierarchical task graph while traversing the control flow graph, which can be done in a single pass of the control flow graph. Also, generating (2710) the grouped representation can include identifying a set of one or more exception handling routines and forming one or more exception handling groups, with each of the exception handling groups including at least one of the one or more exception handling routines.

A set of task regions of the existing source code that can run in parallel as a set of tasks can be identified (2720). For example, this identification (2720) can include mapping data and control dependencies of the set of task regions in the grouped representation, which can include traversing the grouped representation and forming a data structure representing control and data dependencies between task regions in the grouped representation.

The grouped representation can be converted (2730) into modified source code that is configured to self-schedule the set of task regions of the existing source code in parallel as a set of tasks. This conversion (2730) can include encoding (2732) dependencies between the task regions in the grouped representation, such as encoding the dependencies in a control flow graph and/or a table corresponding to the task regions. The conversion (2730) can also include traversing (2734) the grouped representation and using the encoded dependencies to generate the modified source code that is configured to self-schedule task regions in parallel. The modified source code can include one or more lambda expressions that are configured to self-schedule the set of task regions representing portions of the existing source code in parallel. In addition, the lambda expression(s) can include at least one lambda expression that is configured to copy at least one variable into the lambda expression to privatize the at least one variable and break a data anti-dependency on the at least one variable.

Also, the set of regions can be represented with their dependencies in a visual editor display, such as in a configuration similar to the illustration in FIG. 9. The display could also represent corresponding source code, as in FIG. 9. The representation of the existing source code may be, for example, a display of the existing source code itself and/or a display of the modified source code. Such a display can allow a user to make changes to the existing source code and/or the modified source code, which can result in greater efficiencies in a resulting program, such as where a user breaks dependencies to allow some or more parallelism. In addition, the grouped representation can be converted into object code that is configured to self-schedule the set of regions in parallel as a set of tasks. For example, this could include compiling the modified source code or compiling a modified intermediate compiler representation. The translation of the existing source code to the modified source code using the grouped representation (e.g., by generating the grouped representation and converting it into the modified source code); the representation of the set of regions and their dependencies in a visual editor display; and the conversion of the grouped representation into object code that is configured to self-schedule the set of regions in parallel as a set of tasks can all be done automatically and at once, or separately and possibly with some aid from user input.

Figure 28:
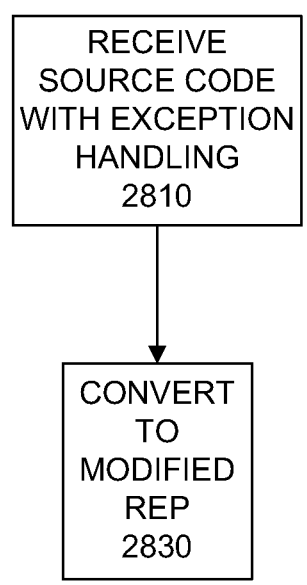
FIG. 28 is a flow diagram of a technique for generating a modified parallel representation of existing source code.

Referring now to FIG. 28, a technique for generating a modified parallel representation of existing source code will be described. In the technique, existing source code that includes one or more exception handling routines can be received (2810). Moreover, the existing source code can be automatically converted (2830) into a modified representation of the existing source code that is configured to self-schedule a set of regions of the existing source code to run in parallel as a set of tasks. The modified representation can include modified source code and/or an intermediate compiler representation. Additionally, the modified representation can be compiled into object code.

Also, the set of task regions can include at least two task regions that are nested within the exception handling routines. Moreover, converting (2830) the grouped representation into a modified representation can include duplicating in the modified representation at least some of the exception handling routines within which at least one of the task regions is nested.

Figure 29:
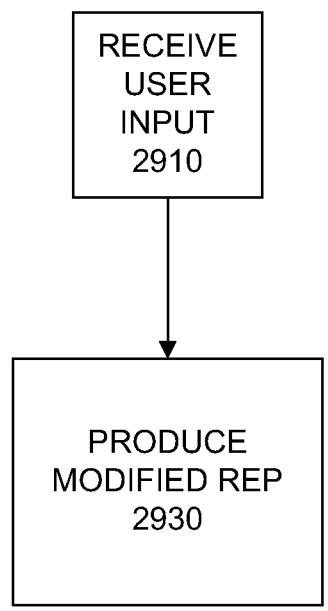
FIG. 29 is a flow diagram of a technique for generating a modified representation of existing source code.

Referring now to FIG. 29, a technique for generating a modified representation of existing source code will be discussed. In the technique, user input can be received (2910). The user input can identify a set of regions of existing source code in one or more lambda expressions. The one or more lambda expressions can identify the regions as regions that can run in parallel. A modified representation of the existing source code can be produced (2930). The modified representation can be configured to self-schedule the set of regions to run in parallel as a set of tasks. The modified representation can include at least one lambda expression that is configured to copy at least one variable into the at least one lambda expression of the modified representation to privatize the at least one variable and break a data dependency (which can be an anti-dependency) on the at least one variable. The modified representation can include modified source code.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, many of the code examples provided herein have been in the C++ source language for convenience and consistency, but the techniques and tools described herein can be applied to code written in a variety of different source languages, such as C#, visual basic, Ruby, Jscript, etc.

I claim:

1. A computer-implemented method comprising:
    generating a grouped representation of existing source code, the grouped representation defining regions of the existing source code, generating the grouped representation comprising:
        generating a control flow graph that represents the existing source code;
        traversing the control flow graph;
        generating a plurality of region graphs that group blocks from the control flow graph into regions, the plurality of region graphs comprising a single entry single exit region graph, a loop region graph, and an exception handling region graph; and
        unifying the plurality of region graphs into the grouped representation, the grouped representation being a hierarchical task graph;
    identifying a set of the regions that can run in parallel based on the grouped representation; and
    converting the grouped representation into modified source code that is configured to self-schedule the set of regions in parallel as a set of tasks.

2. The computer-implemented method of claim 1, wherein converting the grouped representation into the modified source code comprises duplicating in the modified source code one or more exception handling routines within which at least two regions in the set of regions are nested, the modified source code comprising at least two instances of exception handling routines derived from each of the one or more duplicated exception handling routines.

3. The computer-implemented method of claim 1, further comprising:
    representing the set of regions with their dependencies in a visual editor display; and
    converting the grouped representation into object code that is configured to self-schedule the set of regions in parallel as a set of tasks.

4. The computer-implemented method of claim 1, wherein converting the grouped representation comprises:
    encoding dependencies between the set of regions in the grouped representation; and
    traversing the grouped representation while using the encoded dependencies to generate the modified source code.

5. The computer-implemented method of claim 4, wherein identifying the set of the regions that can run in parallel based on the grouped representation comprises mapping data and control dependencies of the set of regions in the grouped representation.

6. The computer-implemented method of claim 1, wherein the plurality of region graphs comprise a user-defined region graph.

7. Computer-readable memory having computer-executable instructions embodied thereon that, when executed, perform acts comprising:
    generating a grouped representation of existing source code, the grouped representation defining regions of the existing source code, generating the grouped representation comprising:
        generating a control flow graph that represents the existing source code;
        traversing the control flow graph;
        generating a plurality of region graphs that group blocks from the control flow graph into regions, the plurality of region graphs comprising a single entry single exit region graph, a loop region graph, and an exception handling region graph; and
        unifying the plurality of region graphs into the grouped representation, the grouped representation being a hierarchical task graph;
    identifying a set of the regions that can run in parallel based on the grouped representation; and
    converting the grouped representation into modified source code that is configured to self-schedule the set of regions in parallel as a set of tasks.

8. The computer-readable memory of claim 1, wherein the acts further comprise:
    representing the set of regions with their dependencies in a visual editor display; and converting the grouped representation into object code that is configured to self-schedule the set of regions in parallel as a set of tasks.

9. The computer-readable memory of claim 1, wherein converting the grouped representation comprises:
encoding dependencies between the set of regions in the grouped representation; and
traversing the grouped representation while using the encoded dependencies to generate the modified source code.

10. The computer-readable memory of claim 1, wherein the grouped representation comprises a hierarchical task graph, and wherein generating the grouped representation comprises:
generating a flow graph representing the existing source code; and
generating the hierarchical task graph from the flow graph.

11. The computer-readable memory of claim 10, wherein identifying the set of the regions that can run in parallel based on the grouped representation comprises mapping data and control dependencies of the set of regions in the grouped representation.

12. The computer-readable memory of claim 1, wherein the plurality of region graphs comprise a user-defined region graph.

13. The computer-readable memory of claim 1, wherein generating the grouped representation comprises identifying a set of one or more exception handling routines and forming one or more exception handling groups, each of the one or more exception handling groups comprising at least one of the one or more exception handling routines, and the set of regions comprising at least one region that is based on at least one of the one or more exception handling groups.

14. The computer-readable memory of claim 1, wherein the modified source code comprises one or more lambda expressions that are configured to self-schedule the set of regions in parallel as a set of tasks.

15. The computer-readable memory of claim 1, wherein:
the acts are performed in a C++ source code compiler environment and the existing source code is C++ source code;
converting the grouped representation comprises:
automatically encoding dependencies between the regions in the grouped representation; and
automatically traversing the grouped representation while using the encoded dependencies to generate the modified source code that is configured to self-schedule the regions as tasks to run in parallel;
the grouped representation comprises a hierarchical task graph;
generating the grouped representation comprises:
automatically generating a control flow graph representing the existing source code; and
automatically generating the hierarchical task graph from the control flow graph; and
the modified source code comprises one or more lambda expressions that are configured to self-schedule the set of regions to run in parallel as a set of tasks.

16. A computer system comprising:
at least one processor; and
a memory comprising instructions stored thereon that when executed by the at least one processor cause the at least one processor to perform acts comprising:
generating a grouped representation of existing source code, the grouped representation defining regions of the existing source code, generating the grouped representation comprising:
generating a control flow graph that represents the existing source code;
traversing the control flow graph; generating a plurality of region graphs that group blocks from the control flow graph into regions, the plurality of region graphs comprising a single entry single exit region graph, a loop region graph, and an exception handling region graph; and
unifying the plurality of region graphs into the grouped representation, the grouped representation being a hierarchical task graph;
identifying a set of the regions that can run in parallel based on the grouped representation; and
converting the grouped representation into a modified representation that is configured to self-schedule the set of regions to run in parallel as a set of tasks.

17. The computer system of claim 16, wherein the modified representation comprises at least one lambda expression that is configured to copy at least one variable into at least one lambda expression of the modified representation to privatize the at least one variable and break a data dependency on the at least one variable.

18. The computer system of claim 17, wherein the data dependency is an anti-dependency.

19. The computer system of claim 16, wherein the modified representation comprises modified source code.

20. The computer system of claim 16, wherein the modified representation is modified source code.

* * * * *